United States Patent
Bae

(10) Patent No.: US 11,544,548 B2
(45) Date of Patent: Jan. 3, 2023

(54) PROCESSING ELEMENT AND NEURAL PROCESSING DEVICE INCLUDING SAME

(71) Applicant: Rebellions Inc., Seongnam-si (KR)

(72) Inventor: Jaewan Bae, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 17/664,393

(22) Filed: May 20, 2022

(65) Prior Publication Data
US 2022/0374691 A1 Nov. 24, 2022

(30) Foreign Application Priority Data

May 24, 2021 (KR) .......................... 10-2021-0066271
May 10, 2022 (KR) .......................... 10-2022-0057472

(51) Int. Cl.
G06N 3/063 (2006.01)
G06F 7/523 (2006.01)
G06F 7/50 (2006.01)
G06F 15/80 (2006.01)

(52) U.S. Cl.
CPC .............. *G06N 3/063* (2013.01); *G06F 7/50* (2013.01); *G06F 7/523* (2013.01); *G06F 15/80* (2013.01)

(58) Field of Classification Search
CPC ........ G06N 3/063; G06N 3/0454; G06N 3/08; G06N 20/00; G06F 7/50; G06F 7/523; G06F 13/00; G06F 15/80; G06F 9/30014
See application file for complete search history.

(56) References Cited

U.S. PATENT DOCUMENTS

| | | | | |
|---|---|---|---|---|
| 11,216,717 B2* | 1/2022 | Baum | .................... | G06F 30/30 |
| 11,221,929 B1* | 1/2022 | Katz | .................... | G06F 11/1004 |
| 11,263,077 B1* | 3/2022 | Seznayov | ............. | G06F 3/0673 |
| 2018/0285718 A1* | 10/2018 | Baum | ................. | G06F 9/30054 |
| 2019/0080223 A1* | 3/2019 | Fraser | .................... | G06N 3/084 |
| 2020/0005127 A1* | 1/2020 | Baum | .................... | G06N 3/084 |
| 2021/0200513 A1* | 7/2021 | Kang | ...................... | G06F 5/012 |
| 2021/0255860 A1* | 8/2021 | Morrison | ............... | G06N 3/063 |
| 2021/0406655 A1* | 12/2021 | Ngo | ......................... | G06N 3/08 |
| 2022/0100601 A1* | 3/2022 | Baum | ......................... | G06N 3/02 |
| 2022/0101042 A1* | 3/2022 | Kaminitz | ............. | G06K 9/6219 |
| 2022/0103186 A1* | 3/2022 | Kaminitz | ............. | G06K 9/6219 |
| 2022/0300794 A1* | 9/2022 | Oh | ......................... | G06N 3/063 |

FOREIGN PATENT DOCUMENTS

| | | |
|---|---|---|
| KR | 10-1981109 B1 | 5/2019 |
| KR | 10-2258566 B1 | 6/2021 |

* cited by examiner

*Primary Examiner* — Helen Rossoshek
(74) *Attorney, Agent, or Firm* — Broadview IP Law, PC

(57) ABSTRACT

The present disclosure discloses a processing element and a neural processing device including the processing element. The processing element includes a weight register configured to store a weight, an input activation register configured to store an input activation, a flexible multiplier configured to receive a first sub-weight of a first precision included in the weight, receive a first sub-input activation of the first precision included in the input activation, and generate result data by performing multiplication calculation of the first sub-weight and the first sub-input activation as the first precision or a second precision different from the first precision according to the first sub-weight and the first sub-input activation and a saturating adder configured to generate a partial sum by using the result data.

16 Claims, 30 Drawing Sheets

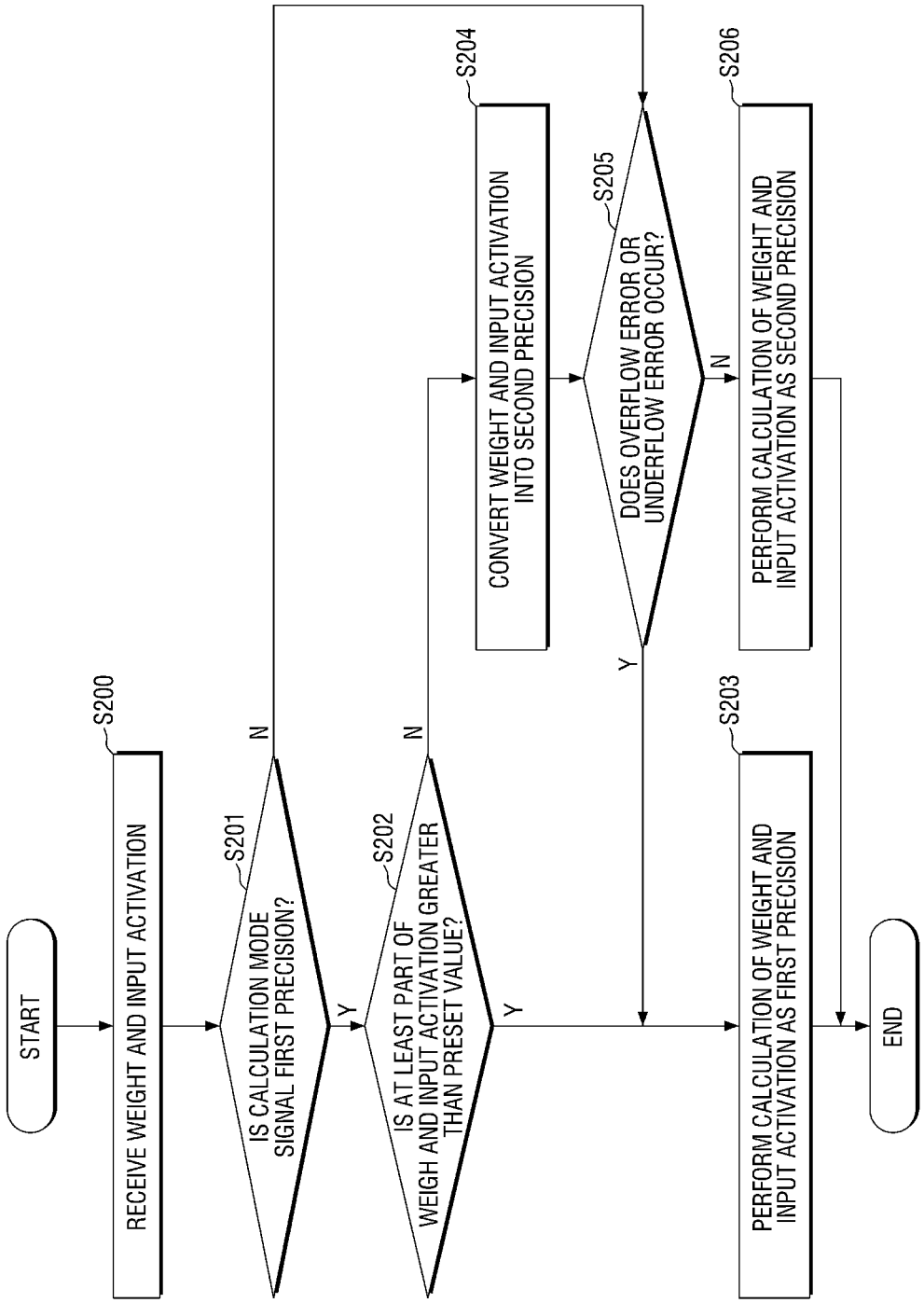

PROCESSING ELEMENT AND NEURAL PROCESSING DEVICE INCLUDING SAME

CROSS-REFERENCE TO RELATED APPLICATION

This application claims priority under 35 U.S.C § 119 to Korean Patent Application No. 10-2021-0066271 filed on May 24, 2021, and Korean Patent Application No. 10-2022-0057472 filed on May 10, 2022, in the Korean Intellectual Property Office, entire contents of which are hereby incorporated by reference.

BACKGROUND

1. Field

The present disclosure relates to a processing element and a neural processing device including the processing element. Specifically, the present disclosure relates to a processing element that selects a multiplier for performing calculation according to a weight and a size of an input activation, and a neural processing device including the processing element.

2. Description of the Related Art

For the past few years, artificial intelligence technology has been the core technology of the Fourth Industrial Revolution and the subject of discussion as the most promising technology worldwide. The biggest issue with such artificial intelligence technology is computing performance. For artificial intelligence technology, which realizes human learning ability, reasoning ability, perceptual ability, natural language implementation ability, etc., it is of utmost important to process a large amount of data quickly.

The central processing units (CPUs) or graphics processing unit (GPUs) of off-the-shelf computers were used for deep-learning training and inference in early artificial intelligence, but had limitations on the tasks of deep-learning training and inference with high workloads, and thus, neural processing units (NPUs) that are structurally specialized for deep learning tasks have received a lot of attention.

Since such a neural processing unit includes a large number of processing units and cores inside thereof, the synchronization of these modules is required to be clearly processed according to the dependency of a task. In conventional processing units, a control processor or centralized controller centrally controlled these synchronization signals and managed operations in order.

However, such a method can result in a lot of latency in synchronization processing and increased overhead of the control processor as more and more processing units and cores are included in the neural processing unit.

The description set forth in the background section should not be assumed to be prior art merely because it is set forth in the background section. The background section may describe aspects or embodiments of the present disclosure.

SUMMARY

An object of the present disclosure is to provide a processing element capable of reducing power consumption by performing calculation as various precisions according to a size of data.

Another object of the present disclosure is to provide a neural processing device capable of reducing power consumption by performing calculation as various precisions according to a size of data.

Objects of the present disclosure are not limited to the objects described above, and other objects and advantages of the present disclosure not described may be understood by the following description and will be more clearly understood by the embodiments of the present disclosure. In addition, it will be apparent that the objects and advantages of the present disclosure may be implemented by the means and combinations thereof indicated in the claims.

According to an aspect of the present disclosure, there is provided a processing element comprising a weight register configured to receive and store weights, an input activation register configured to store input activations, a flexible multiplier configured to receive the weight and the input activation, to perform a multiplication calculation in a first precision or a second precision different from the first precision according to a mode signal, occurrence of an overflow, and occurrence of an underflow, and to generates result data; and a saturating adder configured to receive the result data and generate partial sums.

According to some aspects of the present disclosure, there is provided a processing element comprises a weight register configured to store a weight; an input activation register configured to store an input activation; flexible multiplier configured to receive a first sub-weight of a first precision included in the weight, receive a first sub-input activation of the first precision included in the input activation, and generate result data by performing multiplication calculation of the first sub-weight and the first sub-input activation as the first precision or a second precision different from the first precision according to the first sub-weight and the first sub-input activation and a saturating adder configured to generate a partial sum by using the result data.

In some embodiments of the present disclosure, the flexible multiplier includes a path determination unit configured to generate a path determination signal based on the first sub-weight and the first sub-input activation, a first multiplier configured to perform multiplication calculation with the first precision, a second multiplier configured to perform multiplication calculation with the second precision, and a demultiplexer configured to provide any one of the first multiplier and the second multiplier with the first sub-weight and the first sub-input activation in response to the path determination signal.

In some embodiments of the present disclosure, the path determination unit generates the path determination signal as a first signal for providing the first sub-weight and the first sub-input activation to the first multiplier if a size of at least one of the first sub-weight and the first sub-input activation is greater than a predetermined first size, and generates the path determination signal as a second signal for providing the first sub-weight and the first sub-input activation to the second multiplier if a size of each of the first sub-weight and the first sub-input activation is less than or equal to the first size.

In some embodiments of the present disclosure, the path determination unit includes a bit division logic configured to generate the first sub-weight by dividing the weight into a unit of the first precision or the second precision and generate the first sub-input activation by dividing the input activation into a unit of the first precision or the second precision in response to the calculation mode signal, a path selection logic configured to generate the path determination signal based on the calculation mode signal, the first sub-weight, and the first sub-input activation, and a conversion logic configured to convert precisions of the first sub-weight and the first sub-input activation.

In some embodiments of the present disclosure, wherein the number of the first multipliers is k, and the number of the second multipliers is 2k, where k is a natural number.

In some embodiments of the present disclosure, the first precision has 2N bits, and the second precision has N bits, where N is a natural number.

In some embodiments of the present disclosure, the first precision is INT4 and the second precision is INT2.

In some embodiments of the present disclosure, the weight includes the first sub-weight and the second sub-weight, the input activation includes the first sub-input activation and the second sub-input activation, the flexible multiplier generates a first path determination signal based on the first sub-weight and the first sub-input activation, and generates a second path determination signal based on the second sub-weight and the second sub-input activation, and the first path determination signal and the second path determination signal are independently generated.

In some embodiments of the present disclosure, the weight includes the first sub-weight and the second sub-weight, the input activation includes the first sub-input activation and the second sub-input activation, and the flexible multiplier generates the path determination signal based on the first sub-weight, the second sub-weight, the first sub-input activation, and the second sub-input activation.

In some embodiments of the present disclosure, the flexible multiplier includes a control pipeline configured to synchronize reception of the first sub-weight and the first sub-input activation with generation of the result data.

According to some aspects of the present disclosure, a processing element comprises a weight register configured to store a weight; an input activation register configured to store an input activation; a flexible multiplier configured to generate result data by performing multiplication calculation of the weight and the input activation as the first precision or a second precision different from the first precision based on a calculation mode signal; and a saturating adder configured to generate a partial sum by using the result data.

In some embodiments of the present disclosure, the flexible multiplier includes an error detection logic configured to generate a detection result by checking whether overflow or underflow occurs according to multiplication calculation of the weight and the input activation, k first multipliers of the first precision, 2k second multipliers of the second precision, and a path selection logic configured to select any one of the first multiplier and the second multiplier based on sizes of the weight and the input activation.

In some embodiments of the present disclosure, the path selection logic selects any one of the first multiplier and the second multiplier based on whether at least one of the weight and the input activation is greater than a greatest value of the second precision, if the calculation mode signal is associated with the first precision.

In some embodiments of the present disclosure, the error detection logic generates a first result if overflow or underflow occurs in multiplication calculation of the weight and the input activation and generates a second result if overflow or underflow does not occur in the multiplication calculation of the weight and the input activation, and in a case where each of the weight and the input activation is less than the greatest value of the second precision, the path selection logic selects the first multiplier if the detection result is the first result and selects the second multiplier if the detection result is the second result.

In some embodiments of the present disclosure, the path selection logic selects any one of the first multiplier and the second multiplier according to the detection result when the calculation mode signal is associated with the second precision.

In some embodiments of the present disclosure, the error detection logic generates a first result if overflow or underflow occurs in the multiplication calculation of the weight and the input activation and generates a second result if the overflow or the underflow does not occur in the multiplication calculation of the weight and the input activation, and the path selection logic selects the first multiplier if the detection result is the first result and selects the second multiplier if the detection result is the second result.

According to some aspects of the present disclosure, a neural processing device comprises at least one neural core, wherein the neural core includes a processing unit configured to perform calculation, and a L0 memory configured to store input/output data of the processing unit, the processing unit includes a PE array including at least one processing element, and the PE array includes a flexible multiplier configured to receive a weight and an input activation and perform multiplication calculation with the first precision or a second precision less than the first precision based on sizes of the weight and the input activation, and a saturating adder configured to receive the result data and generate a partial sum.

In some embodiments of the present disclosure, the flexible multiplier performs multiplication calculation of the weight and the input activation as the first precision if a size of at least one of the weight and the input activation is greater than a greatest value of the second precision, and performs multiplication calculation of the weight and the input activation as the second precision if a size of each of the weight and the input activation is less than or equal to the greatest value of the second precision.

In some embodiments of the present disclosure, the weight includes a first sub-weight and a second sub-weight, the input activation includes a first sub-input activation and a second sub-input activation, and the flexible multiplier performs multiplication calculation of the first sub-weight and the first sub-input activation as the first precision or the second precision according to the first sub-weight and the first sub-input activation and performs multiplication calculation of the second sub-weight and the second sub-input activation as the first precision or the second precision based on sizes of the second sub-weight and the second sub-input activation.

In some embodiments of the present disclosure, the weight includes a first sub-weight and a second sub-weight, the input activation includes a first sub-input activation and a second sub-input activation, and the flexible multiplier performs multiplication calculation of the weight and the input activation as the first precision or the second precision according to respective sizes of the first sub-weight, the second sub-weight, the first sub-input activation, and the second sub-input activation.

Effects of the Invention

According to the present disclosure, a processing element and a neural processing device including the processing element may reduce power consumption by performing calculation of an appropriate precision according to the size of data.

In addition, when overflow or underflow occurs, conversion of precision is performed to increase degree of precision.

Specific effects of the present disclosure will be described together with the above description while describing specific details for implementing the present disclosure below.

BRIEF DESCRIPTION OF THE DRAWINGS

FIG. 30 is a diagram illustrating a calculation method of a neural processing device according to some other embodiments of the present disclosure.

DETAILED DESCRIPTION

Figure 1:
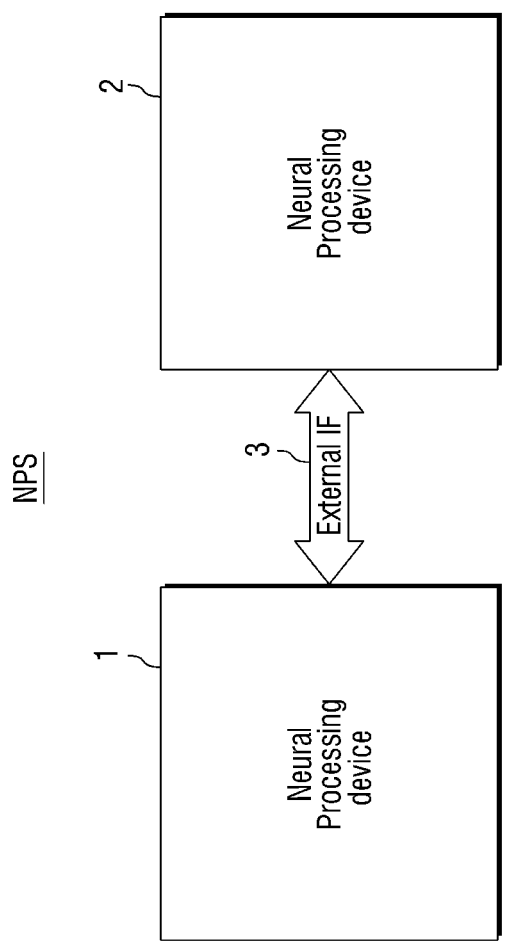
FIG. 1 is a block diagram for illustrating a neural processing system in accordance with some embodiments of the present disclosure.

The present disclosure will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, a neural processing device in accordance with some embodiments of the present disclosure will be described with reference to FIGS. 1 to 28.

FIG. 1 is a block diagram for illustrating a neural processing system in accordance with some embodiments of the present disclosure.

With reference to FIG. 1, a neural processing system NPS in accordance with some embodiments of the present disclosure may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the present embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments of the present disclosure is not limited thereto. That is, in a neural processing system NPS in accordance with some embodiments of the present disclosure, three or more neural processing devices may be connected to one another via the external interface 3. Also, conversely, a neural processing system NPS in accordance with some embodiments of the present disclosure may include only one neural processing device.

Figure 2:
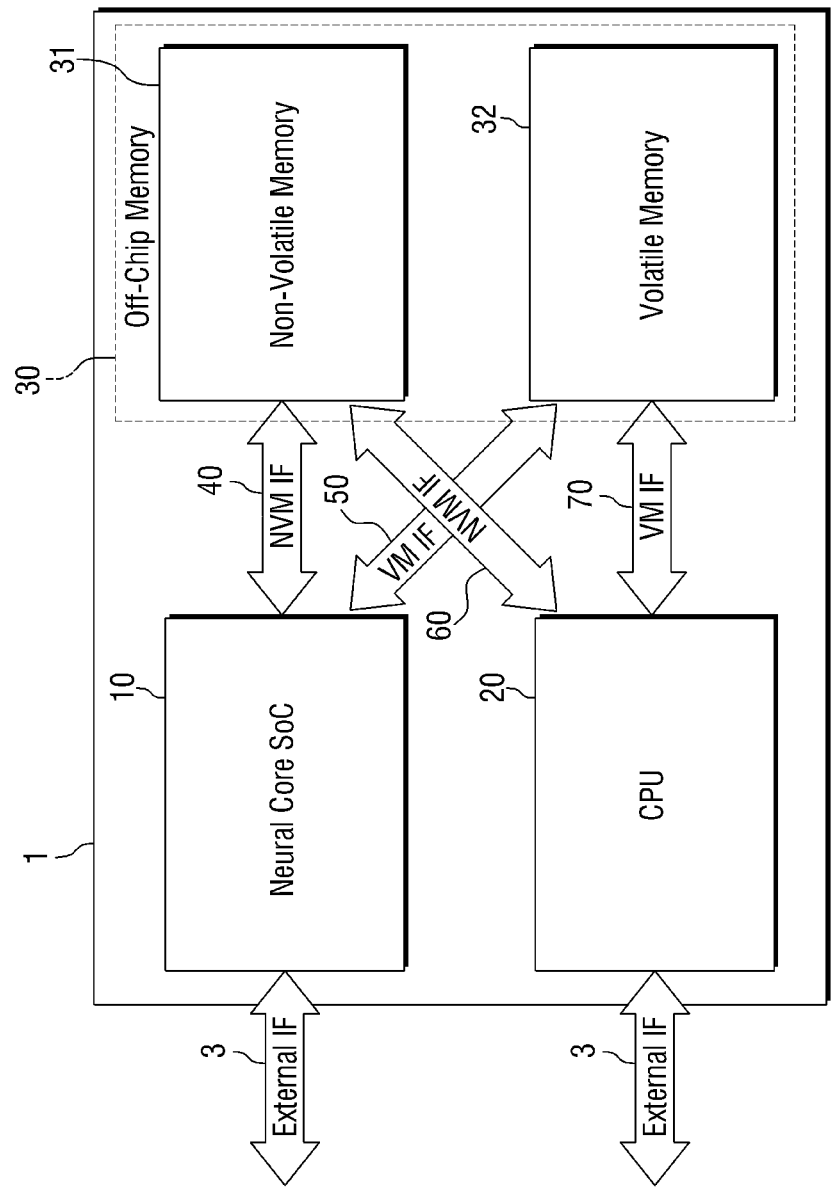
FIG. 2 is a block diagram for illustrating in detail the neural processing device of FIG. 1.

FIG. 2 is a block diagram for illustrating in detail the neural processing device of FIG. 1.

With reference to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 is an artificial intelligence calculation unit, which may be an accelerator. The neural core SoC 10 may be, for example, any one of a graphics processing unit (GPU), a field-programmable gate array (FPGA), and an application-specific integrated circuit (ASIC). However, the present embodiment is not limited thereto.

The neural core SoC 10 may exchange data with other external calculation units via the external interface 3. In addition, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation unit and may have low efficiency in performing simple parallel calculations that are used a lot in deep learning. Therefore, there can be high efficiency by performing calculations in deep learning inference and training tasks by the neural core SoC 10.

The CPU 20 may exchange data with other external calculation units via the external interface 3. Moreover, the CPU 20 may be connected to the non-volatile memory 31 and the volatile memory 32 via the second non-volatile memory interface 60 and the second volatile memory interface 70, respectively.

The off-chip memory 30 may be a memory placed outside the chip of the neural core SoC 10. The off-chip memory 30 may include the non-volatile memory 31 and the volatile memory 32.

The non-volatile memory 31 may be a memory that continuously retains stored information even when electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, and 3D XPoint memory. However, the present embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), and Double Data Rate SDRAM (DDR SDRAM). However, the present embodiment is not limited thereto.

The first non-volatile memory interface 40 and the second non-volatile memory interface 60 may each include, for example, at least one of Parallel Advanced Technology Attachment (PATA), Small Computer System Interface (SCSI), Serial Attached SCSI (SAS), Serial Advanced Technology Attachment (SATA), and PCI Express (PCIe). However, the present embodiment is not limited thereto.

The first volatile memory interface 50 and the second volatile memory interface 70 may each be, for example, at least one of SDR (Single Data Rate), DDR (Double Data Rate), QDR (Quad Data Rate), and XDR (eXtreme Data Rate, Octal Data Rate). However, the present embodiment is not limited thereto.

Figure 3:
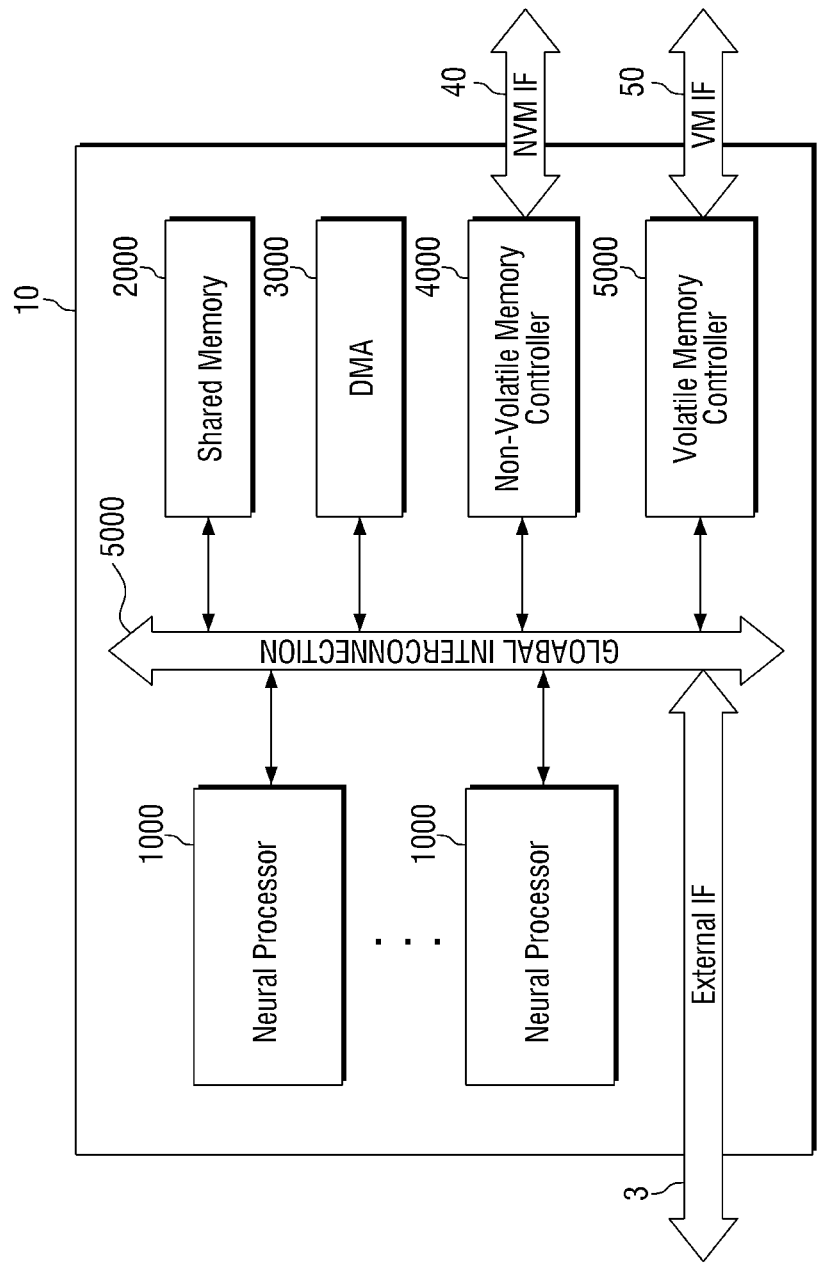
FIG. 3 is a block diagram for illustrating in detail the neural core SoC of FIG. 2.

FIG. 3 is a block diagram for illustrating in detail the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 5000.

The neural processor 1000 may be a calculation unit that directly performs calculation tasks. If there exist neural processors 1000 in plurality, calculation tasks may be assigned to respective neural processors 1000. The respective neural processors 1000 may be connected to each other via the global interconnection 5000.

The shared memory 2000 may be a memory shared by multiple neural processors 1000. The shared memory 2000 may store data of each neural processor 1000. Further, the shared memory 2000 may receive data from the off-chip memory 30, store them temporarily, and transfer them to each neural processor 1000. On the contrary, the shared memory 2000 may also receive data from the neural processor 1000, store them temporarily, and transmit them to the off-chip memory 30 of FIG. 2.

The shared memory 2000 may need a relatively high-speed memory. Accordingly, the shared memory 2000 may include, for example, an SRAM. However, the present embodiment is not limited thereto. That is, the shared memory 2000 may include a DRAM as well.

The shared memory 2000 may be a memory corresponding to the SoC level, i.e., level 3 (L3). Therefore, the shared memory 2000 may also be defined as an L3 shared memory.

The DMA 3000 may directly control the movement of data without the need for the neural processor 1000 to control the input and output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Moreover, the volatile memory controller 5000 may perform a refresh task of the volatile memory 32. The volatile memory controller 5000 may control the non-volatile memory 31 via the first volatile memory interface 50.

The global interconnection 5000 may connect the at least one neural processor 1000, the shared memory 2000, the DMA 3000, the non-volatile memory controller 4000, and the volatile memory controller 5000 to one another. In addition, the external interface 3 may also be connected to the global interconnection 5000. The global interconnection 5000 may be a path through which data travels between the at least one neural processor 1000, the shared memory 2000, the DMA 3000, the non-volatile memory controller 4000, the volatile memory controller 5000, and the external interface 3.

The global interconnection 5000 may transmit not only data but also control signals and may transmit a signal for synchronization. That is, in the neural processing device in accordance with some embodiments of the present disclosure, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in prior art techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Accordingly, the latency resulting from each request and instruction can greatly reduce the efficiency of tasks.

Accordingly, in the neural processing device in accordance with some embodiments of the present disclosure, each neural processor 1000, instead of the control processor, may directly transmit a synchronization signal to another neural processor 1000 according to the dependency of a task. In this case, multiple neural processors 1000 can perform the synchronization tasks in parallel as compared with the method managed by the control processor, thereby minimizing the latency due to synchronization.

Furthermore, the control processor needs to perform the task scheduling of the neural processors 1000 according to a task dependency, and the overhead of such scheduling may also increase significantly as the number of neural processors 1000 increases. Therefore, in the neural processing device in accordance with some embodiments of the present disclosure, the scheduling task is also performed by the individual neural processors 1000, and thus, the performance of the device can be improved without even a scheduling burden resulting therefrom.

Figure 4:
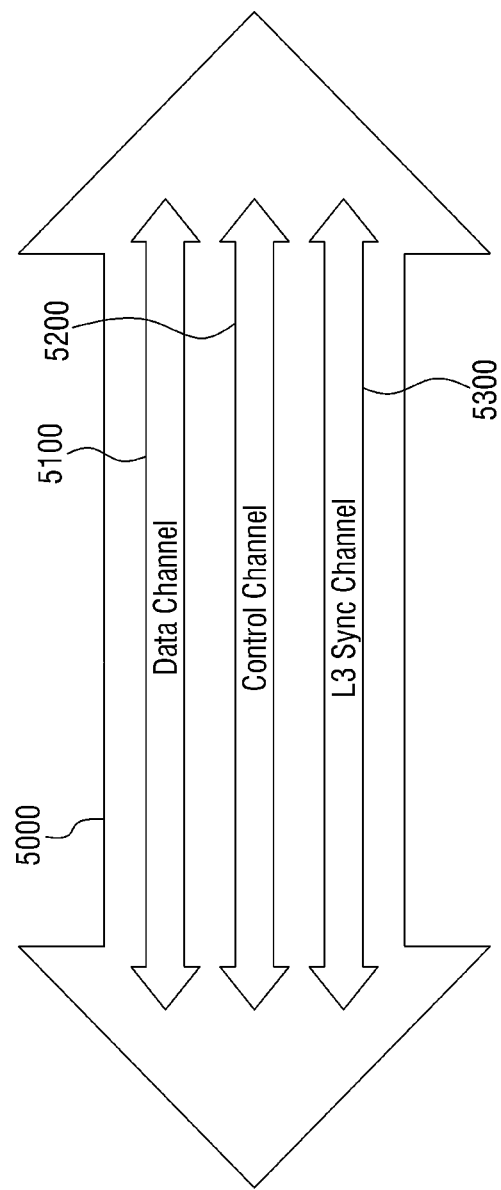
FIG. 4 is a structural diagram for illustrating in detail the global interconnection of FIG. 3.

FIG. 4 is a structural diagram for illustrating in detail the global interconnection of FIG. 3.

Referring to FIG. 4, the global interconnection 5000 may include a data channel 5100, a control channel 5200, and an L3 sync channel 5300.

The data channel 5100 may be a dedicated channel for transmitting data. Through the data channel 5100, the at least one neural processor 1000, the shared memory 2000, the DMA 3000, the non-volatile memory controller 4000, the volatile memory controller 5000, and the external interface 3 may exchange data with one another.

The control channel 5200 may be a dedicated channel for transmitting control signals. Through the control channel 5200, the at least one neural processor 1000, the shared memory 2000, the DMA 3000, the non-volatile memory controller 4000, the volatile memory controller 5000, and the external interface 3 may exchange control signals with one another.

The L3 sync channel 5300 may be a dedicated channel for transmitting synchronization signals. Through the L3 sync channel 5300, the at least one neural processor 1000, the shared memory 2000, the DMA 3000, the non-volatile memory controller 4000, the volatile memory controller 5000, and the external interface 3 may exchange synchronization signals with one another.

The L3 sync channel 5300 may be set as a dedicated channel inside the global interconnection 5000, and thus, may not overlap with other channels and transmit synchronization signals quickly. Accordingly, the neural processing device in accordance with some embodiments of the present disclosure does not require new wiring work and may smoothly perform the synchronization task by utilizing the conventionally used global interconnection 5000.

Figure 5:
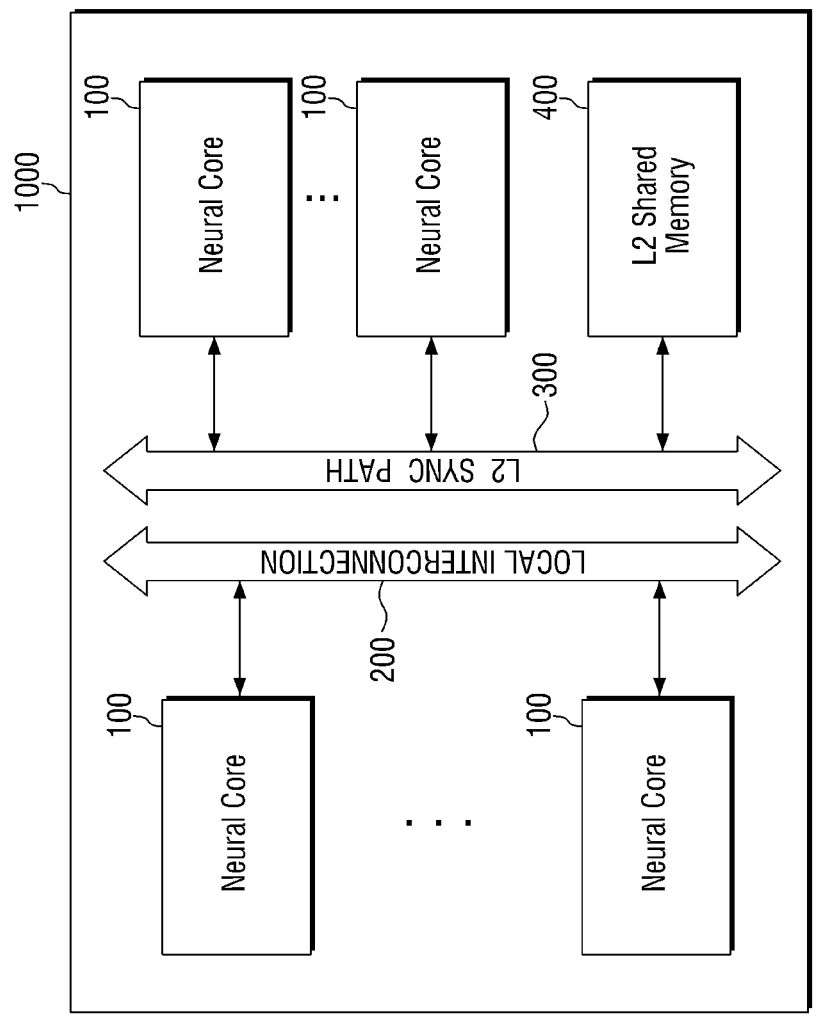
FIG. 5 is a block diagram for illustrating in detail the neural processor of FIG. 3.

FIG. 5 is a block diagram for illustrating in detail the neural processor of FIG. 3.

Referring to FIG. 3 to FIG. 5, the neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, the present embodiment is not limited thereto. FIG. 3 and FIG. 5 illustrate that a plurality of neural cores 100 are included in the neural processor 1000, but the present embodiment is not limited thereto. That is, the neural processor 1000 may be configured with only one neural core 100.

The L2 shared memory 400 may be a memory shared by the respective neural cores 100 in the neural processor 1000. The L2 shared memory 400 may store data of each neural core 100. In addition, the L2 shared memory 400 may receive data from the shared memory 2000 of FIG. 4, store them temporarily, and transmit them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 5000 of FIG. 3.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 5000. In such a case, the L2 sync path 300 may be formed separately so that the synchronization signal can be transmitted quickly and without any delay. The L2 sync path 300 may be used for synchronization performed at a level one step lower than that of the L3 sync channel 5300 of the global interconnection 5000.

Figure 6:
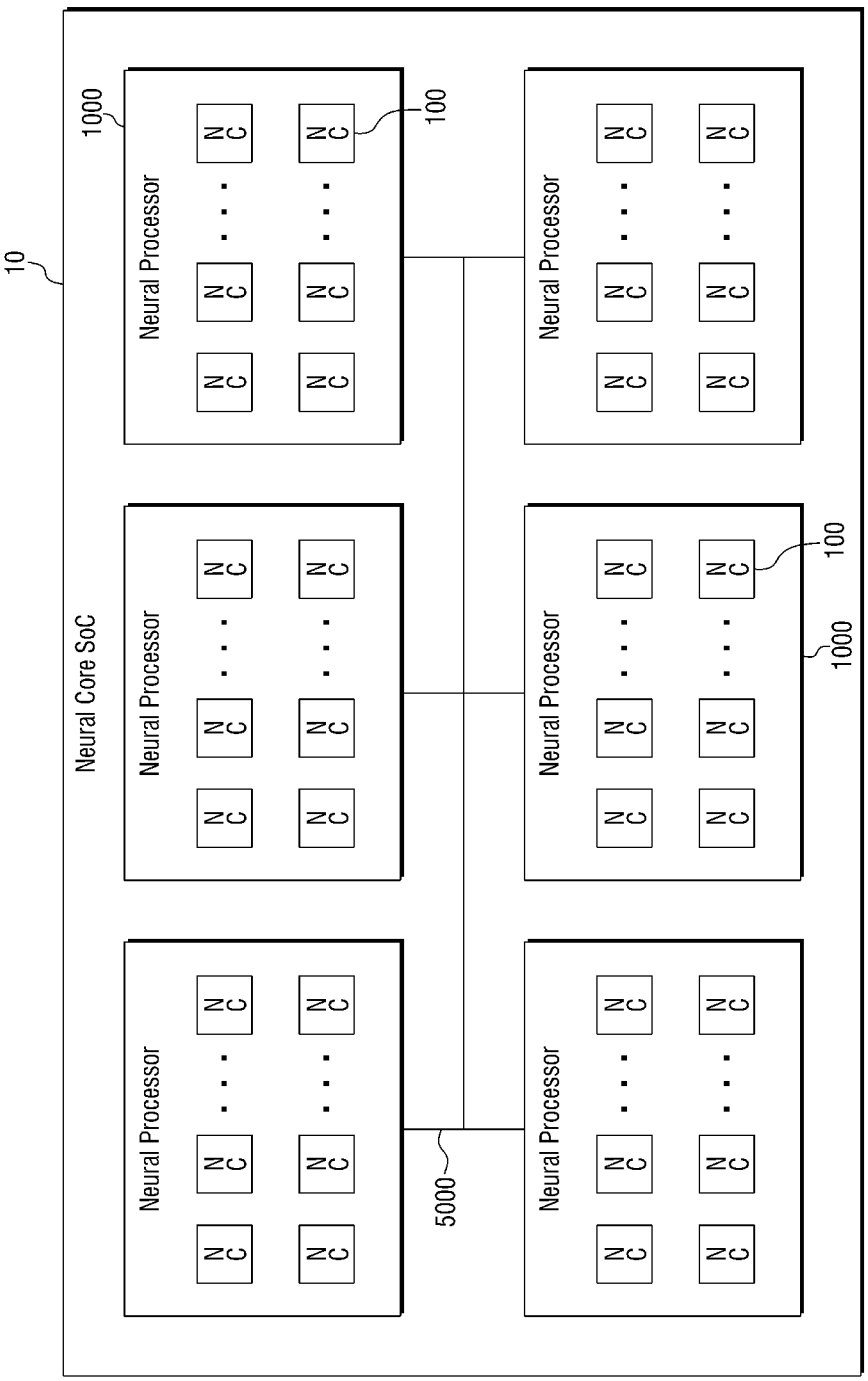
FIG. 6 is a diagram for illustrating a hierarchical structure of a neural processing device in accordance with some embodiments of the present disclosure.

FIG. 6 is a diagram for illustrating a hierarchical structure of a neural processing device in accordance with some embodiments of the present disclosure.

Referring to FIG. 6, the neural core SoC 10 may include at least one neural processor 1000. Each neural processor 1000 may transmit data to each other via the global interconnection 5000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the present embodiment may configure the scales of the minimum calculation unit considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time, since scheduling inefficiency may occur and hardware design cost may increase.

Therefore, in the present embodiment, by adjusting the scales of the scheduling unit of the compiler and the hardware processing unit to be similar, it is possible to simultaneously satisfy the fast scheduling of calculation tasks and the efficient execution of the calculation tasks without wasting hardware resources.

Figure 7:
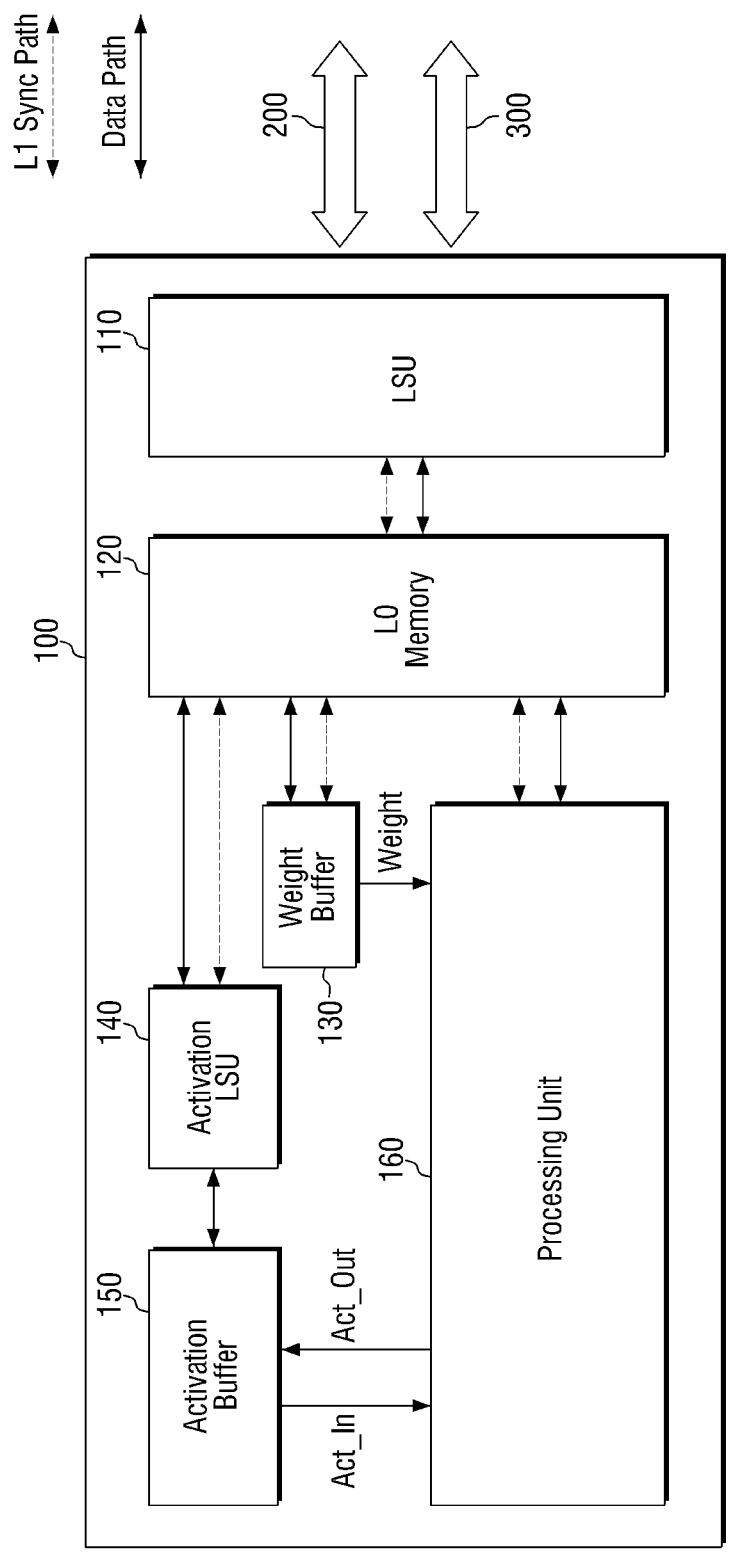
FIG. 7 is a block diagram for illustrating in detail the neural core of FIG. 5.

FIG. 7 is a block diagram for illustrating in detail the neural core of FIG. 5.

Referring to FIG. 7, the neural core 100 may include a load/store unit (LSU) 110, an L0 memory 120, a first weight manipulator 130, an activation LSU 140, an activation buffer 150, and a processing unit 160.

The LSU 110 may receive at least one of data, a control signal, and a synchronization signal from the outside via the local interconnection 200 and the L2 sync path 300. The LSU 110 may transmit at least one of the data, the control signal, and the synchronization signal received to the L0 memory 120. Similarly, the LSU 110 may transfer at least one of the data, the control signal, and the synchronization signal to the outside via the local interconnection 200 and the L2 sync path 300.

Figure 8:
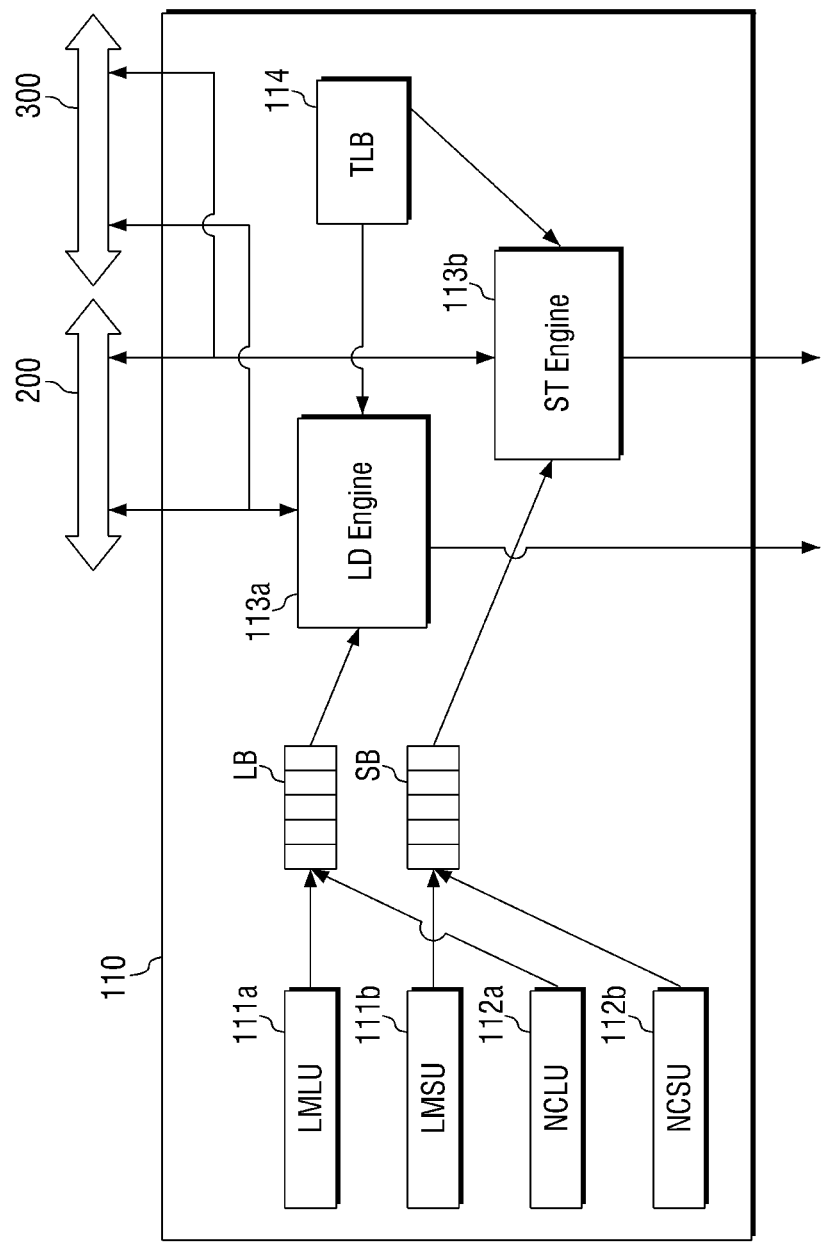
FIG. 8 is a block diagram for illustrating in detail the LSU of FIG. 7.

FIG. 8 is a block diagram for illustrating in detail the LSU of FIG. 7.

Referring to FIG. 8, the LSU 110 may include a local memory load unit 111a, a local memory store unit 111b, a neural core load unit 112a, a neural core store unit 112b, a load buffer LB, a store buffer SB, a load engine 113a, a store engine 113b, and a translation lookaside buffer 114.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

Also, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signals may have a meaning that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a PE array 163 and a vector unit 164.

The L0 memory 120 may be a memory corresponding to the neural core level. The L1 memory may not be shared but be a private memory of the neural core, unlike the L2 shared memory 400 and the shared memory 2000.

The L0 memory 120 may transmit data such as activations or weights via a data path. The L0 memory 120 may exchange synchronization signals via an L3 sync path, which is a separate dedicated path. The L0 memory 120 may exchange synchronization signals with, for example, the LSU 110, the first weight manipulator 130, the activation LSU 140, and the processing unit 160 via the L3 sync path.

The weight buffer 130 may receive a weight from the L0 memory 120. The weight buffer 130 may transmit the weight to the processing unit 160. The weight buffer 130 may temporarily store the weight before transmitting it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training stage, and may be used to derive the output activation Act_Out via a fixed value in the inference stage.

The activation LSU 140 may transmit the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large amount of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 9:
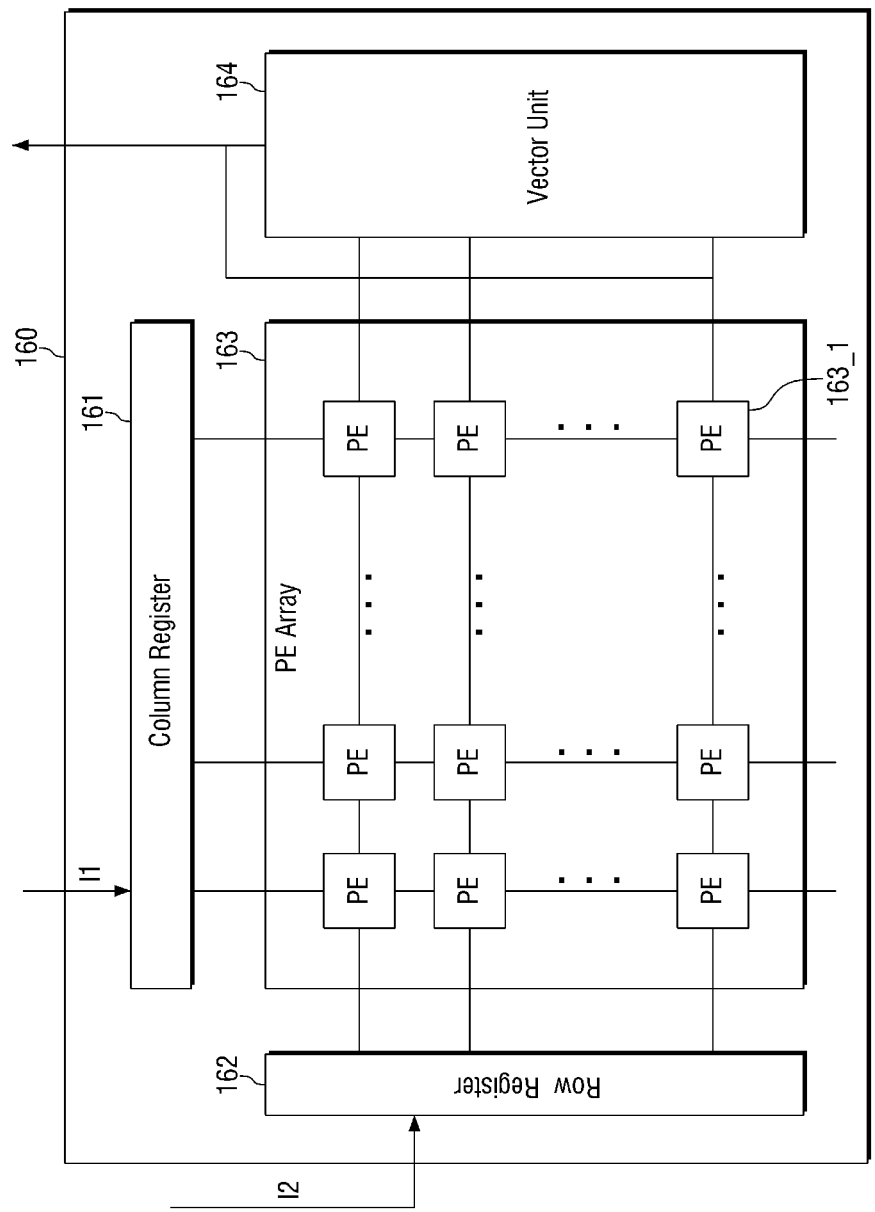
FIG. 9 is a block diagram for illustrating in detail the processing unit of FIG. 7.

FIG. 9 is a block diagram for illustrating in detail the processing unit of FIG. 7.

With reference to FIGS. 7 and 9, the processing unit 160 may include a PE array 163, a vector unit 164, a column register 161, and a row register 162.

The PE array 163 may receive the input activation Act_In and the weight and perform multiplication on them. In this case, the input activation Act_In and the weight may each be in the form of matrices and calculated via convolution. Through this, the PE array 163 may generate an output activation Act_Out. However, the present embodiment is not limited thereto. The PE array 163 may generate any number of different types of outputs other than the output activation Act_Out as well.

The PE array 163 may include at least one processing element 163_1. The processing elements 163_1 may be aligned with each other and may each perform multiplication on one input activation Act_In and one weight.

The PE array 163 may generate a partial sum obtained by summing values for each multiplication. This partial sum may be utilized as an output activation Act_Out. The PE array 163 performs two-dimensional matrix multiplications, and thus, may be referred to as a 2D matrix compute unit.

The vector unit 164 may perform one-dimensional calculations. The vector unit 164, together with the PE array 163, may perform deep learning calculations. Through this, the processing unit 160 may be specialized for necessary calculations. In other words, the neural core 100 has calculation modules, respectively, that perform a large amount of two-dimensional matrix calculations and one-dimensional calculations, and thus, can efficiently perform deep learning tasks.

The column register 161 may receive a first input I1. The column register 161 may receive the first input I1, divide it, and provide them to each column of the processing element PE.

The row register 162 may receive a second input I2. The row register 162 may receive the second input I2, divide it, and provide them to each row of the processing element PE.

The first input I1 may be the input activation Act_In or the weight. The second input I2 may be a value, which is not the first input I1, out of the input activation Act_In or the weight. Alternatively, the first input I1 and the second input I2 may be values other than the input activation Act_In and the weight.

Figure 10:
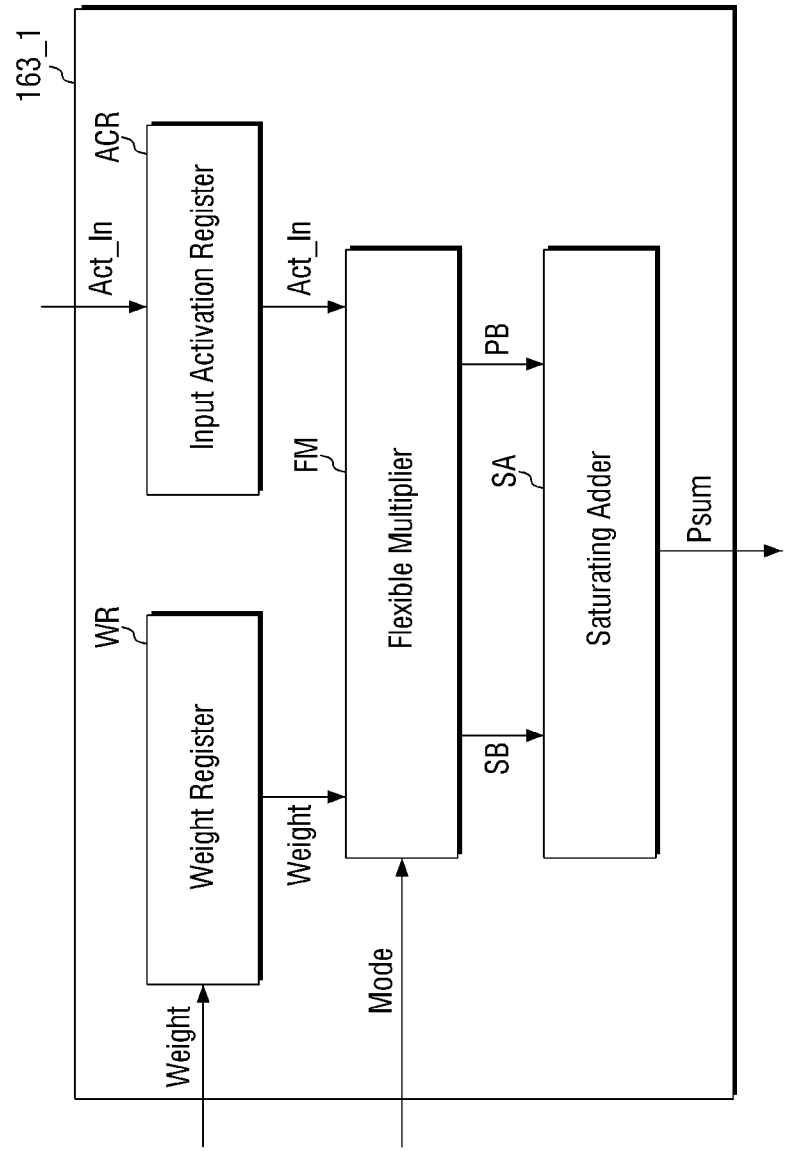
FIG. 10 is a block diagram for illustrating in detail the processing element of FIG. 9.

FIG. 10 is a block diagram for illustrating in detail the processing element of FIG. 9.

Referring to FIG. 10, the processing element 163_1 may include a weight register WR, an input activation register ACR, a flexible multiplier FM, and a saturating adder SA.

The weight register WR may receive and store a weight that is inputted to the processing element 163_1. The weight register WR may transmit the weight to the flexible multiplier FM.

The input activation register ACR may receive and store an input activation Act_In. The input activation register ACR may transmit the input activation Act_In to the flexible multiplier FM.

The flexible multiplier FM may receive the weight and the input activation Act_In. The flexible multiplier FM may perform multiplication of the weight and the input activation Act_In. The flexible multiplier FM may receive a mode signal Mode. In this case, the mode signal Mode may be a signal regarding which precision out of a first precision and a second precision is to be used to perform a calculation.

The flexible multiplier FM may output the multiplication result as result data. The result data may include a sign bit SB and a product bit PB. In this case, the sign bit SB may be a bit indicating the sign of the result data. The product bit PB may be a bit indicating the magnitude of the result data. The flexible multiplier FM may output the result data with the first precision or the second precision.

The saturating adder SA may receive the result data. In other words, the saturating adder SA may receive the sign bit SB and the product bit PB. The saturating adder SA may receive the result data multiple times and accumulate them. Accordingly, the saturating adder SA may generate partial sums Psum. Such partial sums Psum may be outputted from each processing element 163_1 and finally summed up. However, the present embodiment is not limited thereto.

Figure 11:
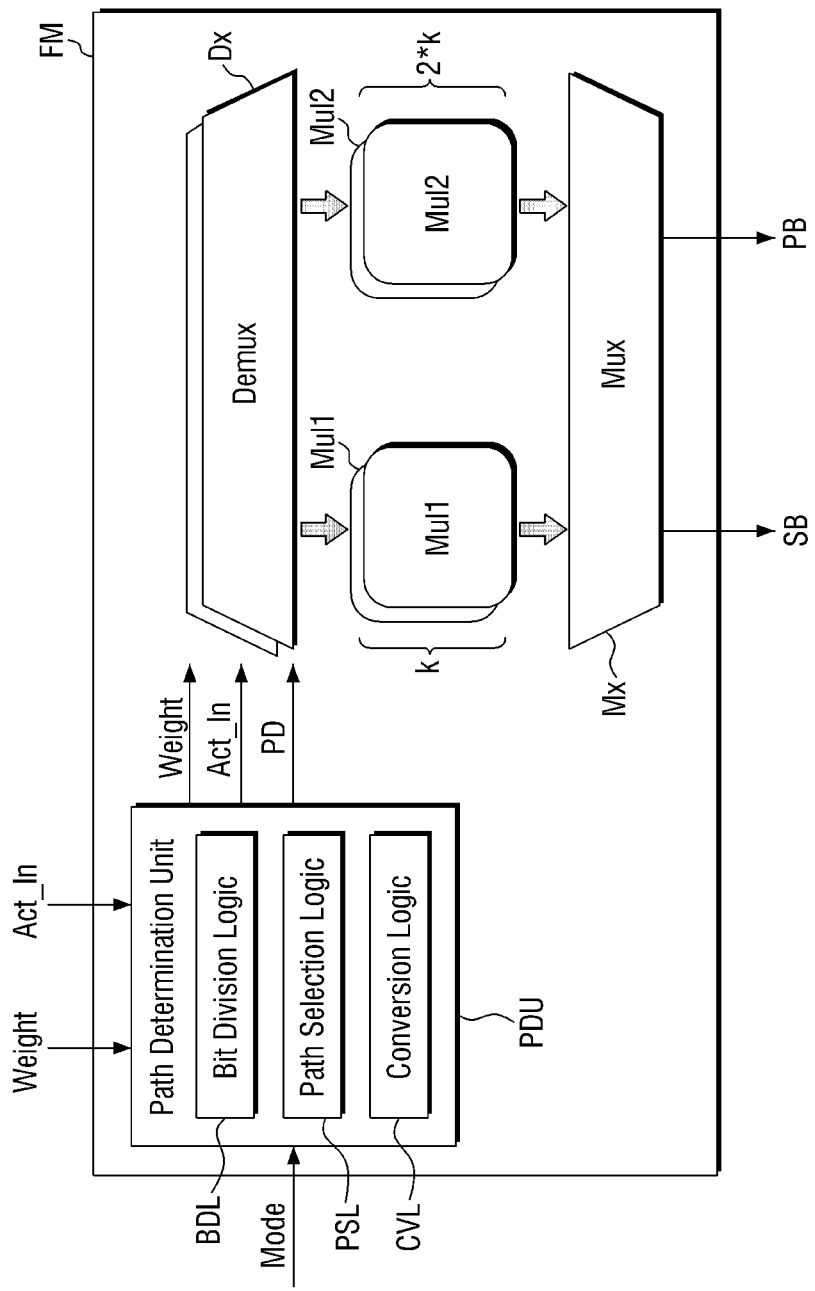
FIG. 11 is a block diagram illustrating a flexible multiplier of FIG. 10 in detail.

FIG. 11 is a block diagram illustrating a flexible multiplier of FIG. 10 in detail.

Referring to FIG. 11, a flexible multiplier FM may include a path determination unit PDU, a demultiplexer Dx, a first multiplier Mul1, a second multiplier Mul2, and a multiplexer Mx.

The path determination unit PDU may receive a weight Weight and an input activation Act_In. In addition, the path determination unit PDU may receive a calculation mode signal Mode. In this case, the calculation mode signal Mode is for performing multiplication calculation by using either a first precision Pr1 or a second precision Pr2. In this case, the first precision Pr1 may be greater than the second precision Pr2. According to some embodiments, the first precision Pr1 may be 2N bits (N is a natural number), and the second precision Pr2 may be N bits. For example, the first precision Pr1 may be INT4 (4-bit integer), and the second precision Pr2 may be INT2 (2-bit integer). However, this is only an example, and the first precision Pr1 and the second precision Pr2 may respectively be INT32 and INT16, or INT16 and INT8, or INT8 and INT4.

The path determination unit PDU may select a multiplier for performing calculation of the weight Weight and the input activation Act_In in response to the calculation mode signal Mode, the weight Weight, and the input activation Act_In. In other words, the path determination unit PDU may generate a path determination signal PD for selecting any one of the first multiplier Mul1 of the first precision Pr1 and the second multiplier Mul2 of the second precision Pr2 in response to the calculation mode signal Mode, the weight Weight, and the input activation Act_In. The path determination unit PDU may provide the generated path determination signal PD, the weight Weight, and the input activation Act_In to the demultiplexer Dx.

According to some embodiments, the path determination unit PDU may include a bit division logic BDL, a path selection logic PSL, and a conversion logic CVL.

The bit division logic BDL may divide the weight Weight and the input activation Act_In into precision units corresponding to the calculation mode signal Mode. In other words, the bit division logic BDL may divide the weight Weight and the input activation Act_In into any one unit of the first precision Pr1 and the second precision Pr2 in response to the calculation mode signal Mode. For example, when the calculation mode signal Mode indicates INT4, the bit division logic BDL may divide each of the weight Weight and the input activation Act_In into a 4-bit unit. The bit division logic BDL may provide the divided weight Weight and the divided input activation Act_In to the path selection logic PSL.

The path selection logic PSL may receive the weight Weight and the input activation Act_In which are divided by the bit division logic BDL. The path selection logic PSL may generate a path determination signal PD for selecting a multiplier for performing calculation of the divided weight Weight and the divided input activation Act_In according to the divided weight Weight, the divided input activation Act_In, and the calculation mode signal Mode.

According to some embodiments, the first multiplier Mul1 may perform multiplication calculation by using input data of the first precision Pr1, and the second multiplier Mul2 may perform multiplication calculation by using input data of the second precision Pr2. In other words, the path selection logic PSL may determine a precision for performing calculation of the divided weight Weight and the divided input activation Act_In by considering the divided weight Weight, the divided input activation Act_In, and the calculation mode signal Mode.

The conversion logic CVL may convert the divided weight Weight and the divided input activation Act_In into other precisions as necessary. According to some embodiments, when a precision associated with the calculation mode signal Mode is different from a precision associated with the path determination signal PD, the conversion logic CVL may convert the divided weight Weight and the divided input activation Act_In into the precision associated with the path determination signal PD. When converting the precisions of the weight Weight and the input activation Act_In, the conversion logic CVL may provide the demultiplexer Dx with the weight Weight and the input activation Act_In of which precisions are converted.

Meanwhile, when the precision associated with the calculation mode signal Mode is the same as the precision associated with the path determination signal PD, the conversion logic CVL may not convert the precisions of the divided weight Weight and the divided input activation Act_In.

In summary, the path determination unit PDU may receive the weight Weight and the input activation Act_In and divide the weight Weight and the input activation Act_In into any one of the first precision Pr1 and the second precision Pr2 in response to the calculation mode signal Mode. The path determination unit PDU may generate the path determination signal PD for selecting any one of the first multiplier Mul1 and the second multiplier Mul2 according to the weight Weight and the input activation Act_In divided into any one of the first precision Pr1 and the second precision Pr2. The path determination unit PDU may provide the weight Weight and the input activation Act_In to the demultiplexer Dx. In addition, the path determination unit PDU may select a multiplier for performing calculation of the weight Weight and the input activation Act_In by providing the path determination signal PD to the demultiplexer Dx.

The demultiplexer Dx may receive the weight Weight and the input activation Act_In from the path determination unit PDU. In this case, the weight Weight and the input activation Act_In received by the path determination unit PDU may be previously divided into a unit of the first precision Pr1 or the second precision Pr2. In addition, the demultiplexer Dx may receive the path determination signal PD from the path determination unit PDU. The demultiplexer Dx provide the weight Weight and the input activation Act_In which are divided into a unit of the first precision Pr1 or the second precision Pr2 to any one of a plurality of first multipliers Mul1 and a plurality of second multipliers Mul2 in response to the path determination signal PD.

The first multiplier Mul1 may perform multiplication calculation with the first precision Pr1. That is, the first multiplier Mul1 may perform multiplication calculation by using input data of the first precision Pr1. For example, the first multiplier Mul1 may receive the weight Weight and the input activation Act_In of the first precision Pr1 and perform multiplication calculation thereof. The number of the first multipliers Mul1 may be k (k is a natural number). For example, a flexible multiplier FM may include eight first multipliers Mul1 of INT4, but embodiments are not limited thereto.

The second multiplier Mul2 may perform multiplication calculation with the second precision Pr2. That is, the second multiplier Mul2 may perform multiplication calculation by using input data of the second precision Pr2. For example, the second multiplier Mul2 may receive the weight Weight and the input activation Act_In of the second precision Pr2 and perform multiplication calculation thereof. The number of the second multipliers Mul2 may be 2k. For example, the flexible multiplier FM may include eight second multipliers Mul2 of INT2, but embodiments are not limited thereto.

The multiplexer Mx may receive a multiplication calculation result from any one of the first multiplier Mul1 and the second multiplier Mul2. In other words, the multiplexer Mx may receive a multiplication calculation result of the weight Weight of the first precision Pr1 and the input activation Act_In of the first precision Pr1 from the first multiplier Mul1. In addition, the multiplexer Mx may receive a multiplication calculation result of the weight Weight of the second precision Pr2 and the input activation Act_In of the second precision Pr2 from the second multiplier Mul2.

The multiplexer Mx may generate result data by summarizing the multiplication calculation results received from the first multiplier Mul1 and the second multiplier Mul2. The result data may include a sine bit SB and a product bit PB. For the sake of convenience of description, k is assumed to be 2 to describe in more detail a structure and an operation of the flexible multiplier FM. However, a case where k is 2 is merely selected for the sake of convenience of description, and embodiments are not limited thereto.

Figure 12:
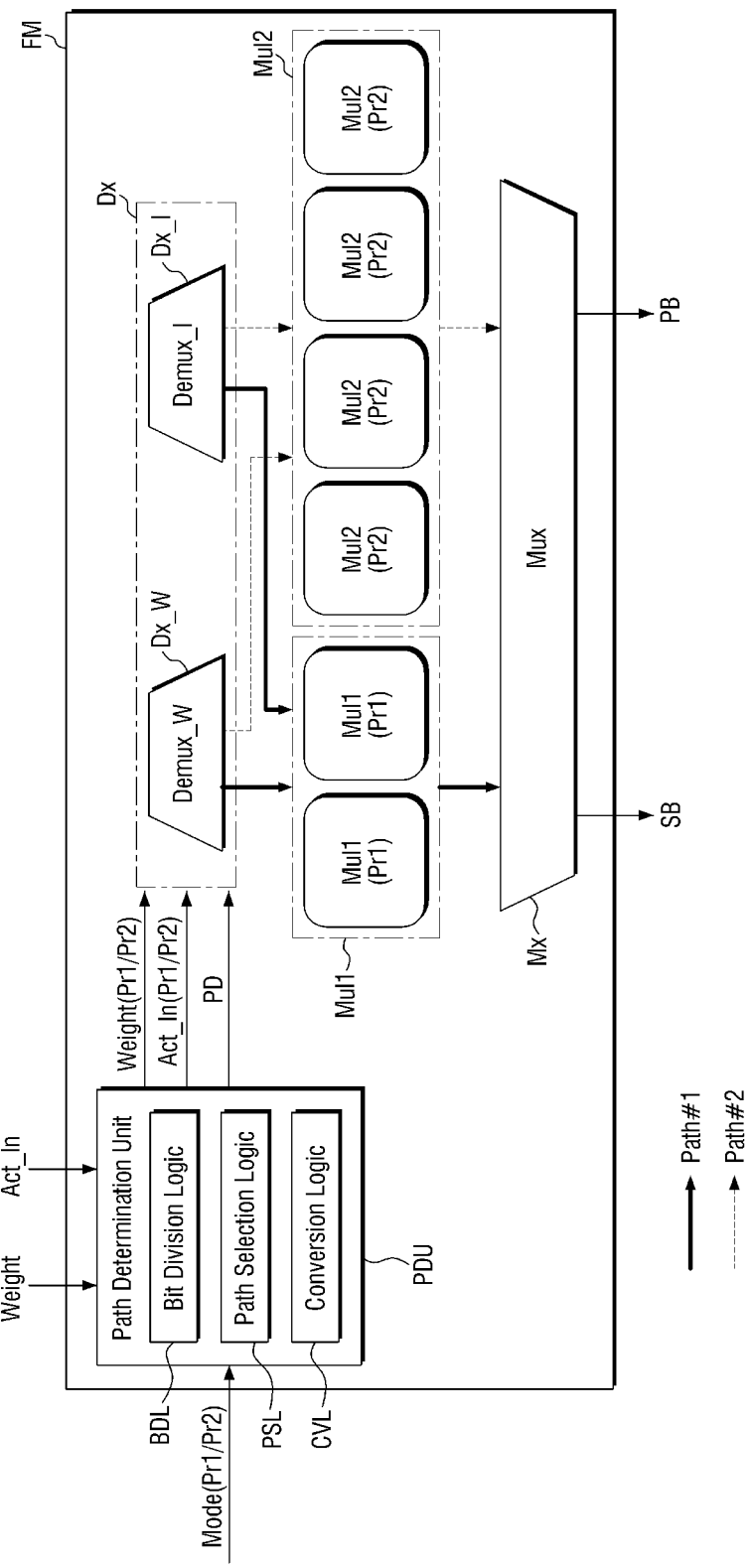
FIG. 12 is a diagram illustrating a structure and an operation of a flexible multiplier according to some embodiments of the present disclosure.

FIG. 12 is a diagram illustrating a structure and an operation of a flexible multiplier according to some embodiments of the present disclosure.

FIG. 12 illustrates a structure of the flexible multiplier FM when k is 2, that is, when the number of the first multipliers Mul1 of the first precision Pr1 is 2 and the number of the second multipliers Mul2 of the second precision Pr2 is 4. However, this is only for the sake of convenience of description, and k may be changed to 4, 8, or so on depending on hardware design.

Referring to FIGS. 11 and 12, the path determination unit PDU may receive the weight Weight and the input activation Act_In. In addition, the path determination unit PDU may receive the calculation mode signal Mode indicating the first precision Pr1 or the second precision Pr2. The path determination unit PDU may determine precisions of the weight Weight and the input activation Act_In to be provided to the demultiplexer Dx according to the weight Weight, the input activation Act_In, and the calculation mode signal Mode, and generate the path determination signal PD for selecting a multiplier that performs calculation of the weight Weight by and the input activation Act_In. For the sake of convenience of description, a path for performing multiplication calculation by using the first multiplier Mul1 is defined as a first path Path #1, and a path for performing multiplication calculation by using the second multiplier Mul2 is defined as a second path Path #2. In other words, the path determination unit PDU may generate the path determination signal PD for selecting any one of the first path Path #1 and the second path Path #2 according to the weight Weight, the input activation Act_In, and the calculation mode signal Mode. The path determination unit PDU may provide the weight Weight and the input activation Act_In of the first precision Pr1 or the second precision Pr2, and the path determination signal PD to the demultiplexer Dx.

The demultiplexer Dx may include a weight demultiplexer Dx_W and an input activation demultiplexer Dx_I. The weight demultiplexer Dx_W may receive the weight Weight of the first precision Pr1 or the second precision Pr2 and the path determination signal PD. The weight demultiplexer Dx_W may provide the received weight Weight to one of the first multiplier Mul1 and the second multiplier Mul2 in response to the path determination signal PD.

Similarly, the input activation demultiplexer Dx_I may receive the input activation Act_In of the first precision Pr1 or the second precision Pr2 and the path determination signal PD. The input activation demultiplexer Dx_I may provide the received input activation Act_In to any one of the first multiplier Mul1 and the second multiplier Mul2 in response to the path determination signal PD.

For example, when the path determination signal PD is a first signal, the weight demultiplexer Dx_W may provide the weight Weight of the first precision Pr1 to the first multiplexer Mul1, and the input activation demultiplexer Dx_I may provide the input activation Act_In of the first precision Pr1 to the first multiplier Mul1. Meanwhile, when the path determination signal PD is a second signal, the weight demultiplexer Dx_W may provide the weight Weight of the second precision Pr2 to the second multiplier Mul2, and the input activation demultiplexer Dx_I may provide the input activation Act_In of the second precision Pr2 to the second multiplier Mul2.

A process of generating the path determination signal PD will be described in more detail with reference to FIG. 13.

Figure 13:
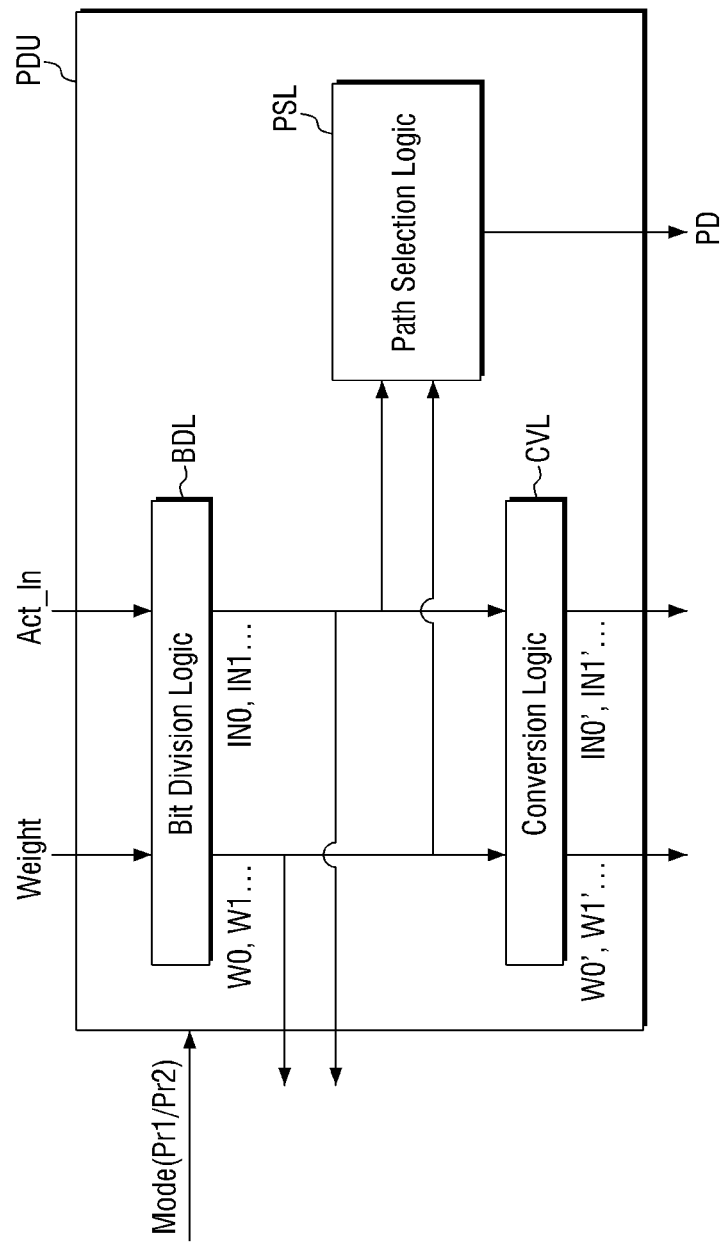
FIG. 13 is a diagram illustrating a structure and an operation of a path determination unit according to some embodiments of the present disclosure.

FIG. 13 is a diagram illustrating a structure and an operation of a path determination unit according to some embodiments of the present disclosure.

Referring to FIG. 13, the bit division logic BDL may receive the weight Weight and the input activation Act_In. The bit division logic BDL may divide the weight Weight and the input activation Act_In into any one of the first precision Pr1 and the second precision Pr2 in response to the calculation mode signal Mode. For example, when the calculation mode signal Mode indicates the first precision Pr1, the bit division logic BDL may respectively divide the weight Weight and the input activation Act_In into the weights Weight and the input activations Act_In of k first precisions Pr1. Similarly, when the calculation mode signal Mode indicates the second precision Pr2, the bit division logic BDL may respectively divide the weight Weight and the input activation Act_In into the weights Weight and the input activations Act_In of 2k second precisions Pr2. For the sake of convenience of description, the weight Weight divided into the first precision Pr1 or the second precision Pr2 is defined as sub-weights W0, W1, . . . , and the input activation Act_In divided into the first precision Pr1 or the second precision Pr2 is defined as sub-input activations IN0, IN1, . . . . That is, the weight Weight may include k or 2k sub-weights W0, W1, . . . , and the input activation Act_In may include k or 2k sub-input activations IN0, IN1, . . . .

For example, it is assumed that the weight Weight and the input activation Act_In are each 8-bit data, the first precision Pr1 is INT4, the second precision Pr2 is INT2, and k is 2. When the calculation mode signal Mode is INT4, the bit division logic BDL may divide the 8-bit weight Weight into INT4 units, that is, a first sub-weight W0 of INT4 and a second sub-weight W1 of INT4. In addition, the bit division logic BDL may divide the 8-bit input activation Act_In into a first sub-input activation IN0 of INT4 and a second sub-input activation IN1 of INT4.

Meanwhile, when the calculation mode signal Mode is INT2, the bit division logic BDL may divide the 8-bit weight Weight into INT2 units, that is, the first sub-weight W0 of INT2, the second sub-weight W1 of INT2, a third sub-weight of INT2, and a fourth sub-weight of INT2. In addition, the bit division logic BDL may divide the 8-bit input activation Act_In into the first sub-input activation IN0 of INT2, the second sub-input activation IN1 of INT2, a third sub-input activation of INT2, and a fourth sub-input activation of INT2.

The path selection logic PSL may generate the path determination signal PD based on the calculation mode signal Mode, the plurality of sub-weights W0, W1, . . . , and the plurality of sub-input activations IN0, IN1, . . . .

A case in which the calculation mode signal Mode is associated with the first precision Pr1 will be described first. The path selection logic PSL may generate the path determination signal PD according to sizes of the plurality of sub-weights W0, W1, . . . , and the plurality of sub-input activations IN0, IN1, . . . . For example, the path selection logic PSL may generate the path determination signal PD based on whether the plurality of sub-weights W0, W1, . . . and the plurality of sub-input activations IN0, IN1, . . . exceed the greatest value of the second precision Pr2.

When a size of at least one of the plurality of sub-weights W0, W1, . . . and the plurality of sub-input activations IN0, IN1, . . . exceeds the greatest value of the second precision Pr2, the path selection logic PSL may generate a first signal for selecting the first multiplier Mul1 as the path determination signal PD. In other words, when the size of at least one of the plurality of sub-weights W0, W1, . . . and the plurality of sub-input activations IN0, IN1, . . . exceeds the greatest value of the second precision Pr2, the path selection logic PSL may generate the first signal as the path determination signal PD such that calculations of the plurality of sub-weights W0, W1, . . . and the plurality of sub-input activations IN0, IN1, . . . are performed as the first precision Pr1.

Meanwhile, when a size of each of the plurality of sub-weights W0, W1, . . . and the plurality of sub-input activations IN0, IN1, . . . does not exceed the greatest value of the second precision Pr2, the path selection logic PSL may generate a second signal for selecting the second multiplier Mul2 as the path determination signal PD. In other words, when the size of each of the plurality of sub-weights W0, W1, . . . and the plurality of sub-input activations IN0, IN1, . . . does not exceed the greatest value of the second precision Pr2, the path selection logic PSL may generate the second signal as the path determination signal PD such that calculations of the plurality of sub-weights W0, W1, . . . and the plurality of sub-input activations IN0, IN1, . . . are performed as the second precision Pr2.

The conversion logic CVL may compare the calculation mode signal Mode with the path determination signal PD to convert precisions of the plurality of sub-weights W0, W1, . . . and the plurality of sub-input activations IN0, IN1, . . . . Specifically, when the precision associated with the calculation mode signal Mode is different from the precision associated with the path determination signal PD, the conversion logic CVL may convert precisions of the plurality of sub-weights W0, W1, . . . and the plurality of sub-input activations IN0, IN1, . . . from a precision associated with the calculation mode signal Mode into a precision associated with the path determination signal PD. For example, when the calculation mode signal Mode is associated with the first precision Pr1 and the path determination signal PD is the second signal, the conversion logic CVL may convert the precisions of the plurality of sub-weights W0, W1, . . . and the plurality of sub-input activations IN0, IN1, . . . from the first precision Pr1 into the second precision Pr2.

When the path determination signal PD generated by the path selection logic PSL is the first signal, the plurality of sub-weights W0, W1, . . . of the first precision Pr1 and the plurality of sub-input activations IN0, IN1, . . . thereof may be provided to the demultiplexer Dx.

Meanwhile, when the path determination signal PD generated by the path selection logic PSL is the second signal, a plurality of sub-weights W0', W1', . . . converted into the second precision Pr2 and a plurality of sub-input activations IN0', IN1', . . . converted into the second precision Pr2 may be provided to the demultiplexer Dx.

In other words, the demultiplexer Dx may receive the first signal as the path determination signal PD and receive the plurality of sub-weights W0, W1, . . . of the first precision Pr1 and the plurality of sub-input activations IN0, IN1, . . . thereof. Alternatively, the demultiplexer Dx may receive the second signal as the path determination signal PD and receive the plurality of sub-weights W0', W1', . . . converted into the second precision Pr2 and the plurality of sub-input activations IN0', IN1', . . . converted into the second precision Pr2.

The demultiplexer Dx may provide the plurality of sub-weights W0, W1, . . . of the first precision Pr1 and the plurality of sub-input activations IN0, IN1, . . . thereof to the first multiplier Mul1 in response to the first signal. Alternatively, the demultiplexer Dx may provide the plurality of sub-weights W0', W1', . . . converted into the second precision Pr2 and the plurality of sub-input activations IN0', IN1', . . . converted into the second precision Pr2 to the second multiplier Mul2 in response to the second signal.

The first multiplier Mul1 may provide the multiplexer Mx with a result of performing multiplication calculation of the plurality of sub-weights W0, W1, . . . of the first precision Pr1 and the plurality of sub-input activations IN0, IN1, . . . of the first precision Pr1. Meanwhile, the second multiplier Mul2 may provide the multiplexer Mx with a result of performing multiplication calculation of the plurality of sub-weights W0', W1', . . . converted into the second precision Pr2 and the plurality of sub-input activations IN0', IN1', . . . converted into the second precision Pr2.

Next, it is assumed that the calculation mode signal Mode is associated with the second precision Pr2. The bit division logic BDL may divide the weight Weight and the input activation Act_In into units of the second precision Pr2 to generate the plurality of sub-weights W0, W1, . . . of the second precision Pr2 and the plurality of sub-input activations IN0, IN1, . . . of the second precision Pr2.

The path selection logic PSL may generate the second signal as the path determination signal PD. The plurality of sub-weights W0, W1, . . . of the second precision Pr2 and the plurality of sub-input activations IN0, IN1, . . . of the second precision Pr2 may be provided to the demultiplexer Dx. In other words, the demultiplexer Dx may receive the second signal as the path determination signal PD and receive the plurality of sub-weights W0, W1, . . . of the second precision Pr2 and the plurality of sub-input activations IN0, IN1, . . . of the second precision Pr2.

The demultiplexer Dx may provide the plurality of sub-weights W0, W1, . . . of the second precision Pr2 and the plurality of sub-input activations IN0, IN1, . . . of the second precision Pr2 to the second multiplier Mul2 in response to the second signal.

The second multiplier Mul2 may provide the multiplexer Mx with a result of performing multiplication calculation of the plurality of sub-weights W0, W1, . . . of the second precision Pr2 and the plurality of sub-input activations IN0, IN1, . . . of the second precision Pr2. An example of the path selection logic PSL will be described with reference to FIG. 14.

Figure 14:
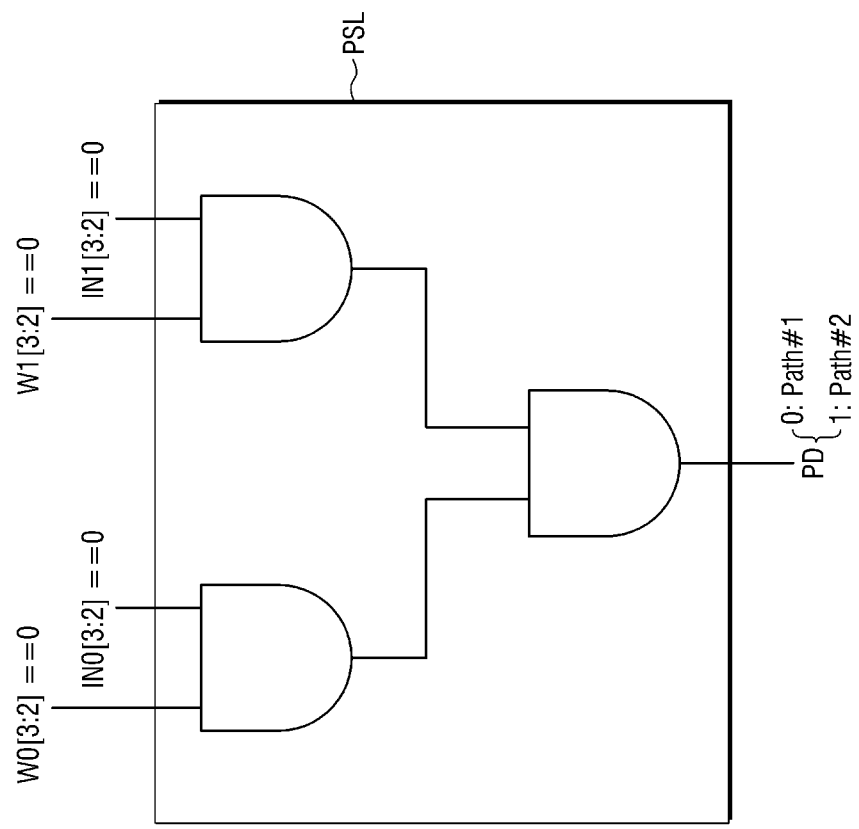
FIG. 14 is a diagram illustrating a configuration of a path selection logic according to some embodiments of the present disclosure.

FIG. 14 is a diagram illustrating a configuration of a path selection logic according to some embodiments of the present disclosure.

For example, it is assumed that the first precision Pr1 is INT4, the second precision Pr2 is INT2, the weight Weight is '00100001', and the input activation Act_In is '10010001'.

Referring to FIGS. 13 and 14, when the calculation mode signal Mode is INT4, the bit division logic BDL may divide the weight Weight into INT4 units in response to the calculation mode signal Mode to generate a first sub-weight W0 and a second sub-weight W1. In this case, the first sub-weight W0 may be '0010', and the second sub-weight W1 may be '0001'. In addition, the bit division logic BDL may divide the input activation Act_In into a first sub-input activation IN0 and a second sub-input activation IN1. In this case, the first sub-input activation IN0 may be '1001', and the second sub-input activation IN1 may be '0001'.

The path selection logic PSL may determine the path determination signal PD as any one of a first signal and a second signal according to sizes of the first sub-weight W0, the second sub-weight W1, the first sub-input activation IN0, and the second sub-input activation IN1. For example, among the first sub-weight W0, the second sub-weight W1, the first sub-input activation IN0, and the second sub-input activation IN1 that are each INT4, the most significant bit of the first sub-input activation IN0 is 1 (is greater than the greatest value of INT2), and thus, the path selection logic PSL may output 0 (the first signal) as the path determination signal PD.

The first sub-weight W0, the second sub-weight W1, the first sub-input activation IN0, and the second sub-input activation IN1 that are each INT4 may be provided to the demultiplexer Dx.

The weight demultiplexer Dx_W may provide the first sub-weight W0 and the second sub-weight W1 that are each INT4 to the first multiplier Mul1 in response to the path determination signal PD, and the input activation demultiplexer Dx_I may provide the first sub-input activation IN0 and the second sub-input activation IN1 that are each INT4 to the first multiplier Mul1 in response to the path determination signal PD.

In another example, it is assumed that the first precision Pr1 is INT4, the second precision Pr2 is INT2, the weight Weight is '00100001', and the input activation Act_In is '00010001'.

Referring to FIGS. 13 and 14, when the calculation mode signal Mode is INT4, the bit division logic BDL may divide the weight Weight into INT4 units in response to the calculation mode signal Mode to generate the first sub-weight W0 and the second sub-weight W1. In this case, the first sub-weight W0 may be '0010', and the second sub-weight W1 may be '0001'. In addition, the bit division logic BDL may divide the input activation Act_In into INT4 units to generate the first sub-input activation IN0 and the second sub-input activation IN1. In this case, the first sub-input activation IN0 may be '0001', and the second sub-input activation IN1 may be '0001'.

The path selection logic PSL may determine the path determination signal PD as any one of a first signal and a second signal according to sizes of the first sub-weight W0, the second sub-weight W1, the first sub-input activation IN0, and the second sub-input activation IN1. For example, two high-order bits of each of the first sub-weight W0, the second sub-weight W1, the first sub-input activation IN0, and the second sub-input activation IN1 that are each INT4 are 00 (less than or equal to the greatest value of INT2), and thus, the path selection logic PSL may output 1 (the second signal) as the path determination signal PD.

Accordingly, the conversion logic CVL may convert the first sub-weight W0, the second sub-weight W1, the first sub-input activation IN0, and the second sub-input activation IN1 that are each INT4 into INT2, and a first sub-weight W0', a second sub-weight W1', a first sub-input activation IN0', and a second sub-input activation IN1' that are each converted into INT2 may be provided to the demultiplexer Dx.

The weight demultiplexer Dx_W may provide the first sub-weight W0' and the second sub-weight W1' that are each converted into INT2 to the second multiplier Mul2 in response to the path determination signal PD, and the input activation demultiplexer Dx_I may provide the first sub-input activation IN0' and the second sub-input activation IN1' that are each converted into INT2 to the second multiplier Mul2 in response to the path determination signal PD.

In other words, when at least one of the first sub-weight W0, the second sub-weight W1, the first sub-input activation IN0, and the second sub-input activation IN1 of the first precision Pr1 is greater than the greatest value of the second precision Pr2, the path selection logic PSL may output the first signal associated with the first path Path #1 as the path determination signal PD. In addition, when each of the first sub-weight W0, the second sub-weight W1, the first sub-input activation IN0, and the second sub-input activation IN1 of the first precision Pr1 is less than or equal to the greatest value of the second precision Pr2, the path selection logic PSL may output the second signal associated with the second path Path #2 as the path determination signal PD. FIG. 14 is only an example for implementing the path selection logic PSL configured for the sake of convenience of description, and embodiments are not limited to the configuration.

The first multiplier Mul1 is a product calculator that performs multiplication calculation with the first precision Pr1, and the second multiplier Mul2 is a product calculator that performs multiplication calculation with the second precision Pr2. The first precision Pr1 is greater than the second precision Pr2, and thus, power required when the first multiplier Mul1 performs calculation is greater than power required when the second multiplier Mul2 performs calculation.

Meanwhile, the flexible multiplier FM according to some embodiments may perform calculation of the plurality of sub-weights W0, W1, . . . and the plurality of sub-input activations IN0, IN1, . . . with the second precision Pr2 according to sizes thereof even when the calculation mode signal Mode is associated with the first precision Pr1. Accordingly, the flexible multiplier FM according to some embodiments may use a calculator of the second precision Pr2 instead of a calculator of the first precision Pr1 in some cases, and thus, there is an advantage in that cost may be reduced due to low power consumption.

According to some embodiments, when the first sub-weight W0, the second sub-weight W1, the first sub-input activation IN0, and the second sub-input activation IN1 of the first precision Pr1 are less than or equal to the greatest value of the second precision Pr2, the path selection logic PSL may perform calculation thereof with the second precision Pr2.

However, according to some embodiments, the path selection logic PSL may generate the path determination signal PD by using only a pair of a sub-weight and a sub-input activation. In other words, the path selection logic PSL may generate a first path determination signal PD1 for the first sub-weight W0 and the first sub-input activation IN0 and generate a second path determination signal PD2 for the second sub-weight W1 and the second sub-input activation IN1. In this case, the first path determination signal PD1 and the second path determination signal PD2 may be independently generated. Additional description thereof will be made with reference to FIGS. 15 and 16.

Figure 15:
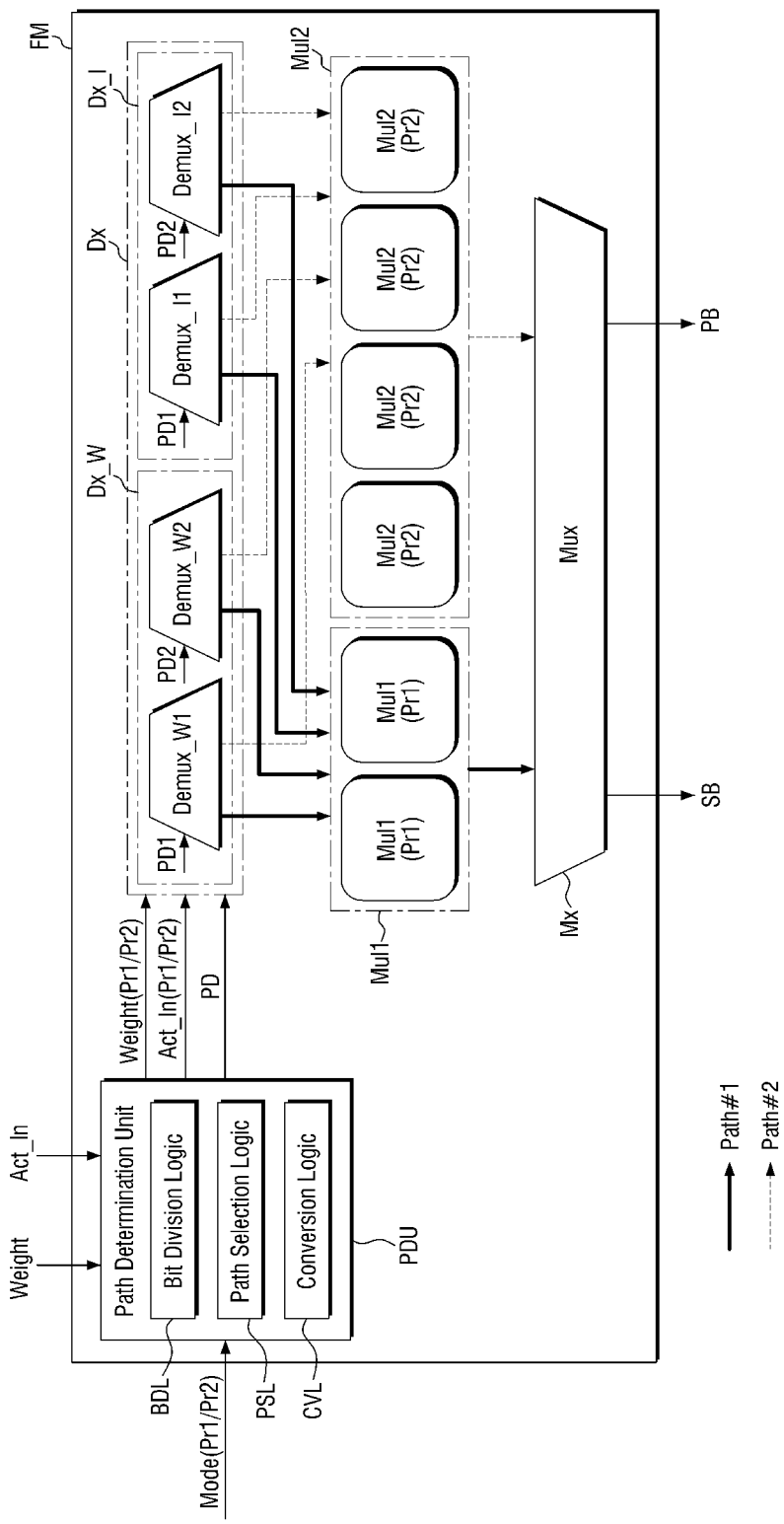
FIG. 15 is a diagram illustrating a structure and an operation of a flexible multiplier according to some other embodiments of the present disclosure.
Figure 16:
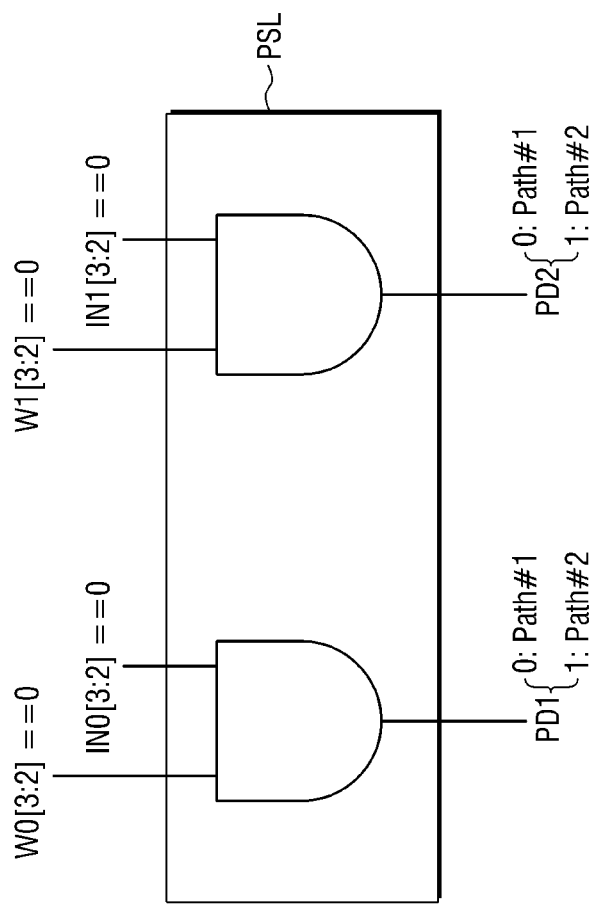
FIG. 16 is a diagram illustrating a configuration of a path selection logic according to some other embodiments of the present disclosure.

FIG. 15 is a diagram illustrating a structure and an operation of a flexible multiplier according to some other embodiments of the present disclosure. FIG. 16 is a diagram illustrating a configuration of a path selection logic according to some other embodiments of the present disclosure. For the sake of convenience of description, contents that are the same as or similar to the contents described above will be omitted or simply described.

Similarly to the case of FIG. 12, FIG. 15 illustrates a structure of the flexible multiplier FM when k is 2, that is, when there are two first multipliers Mul1 of the first precision Pr1 and there are four second multipliers Mul2 of the second precision Pr2.

Referring to FIGS. 15 and 16, the weight demultiplexer Dx_W may include a first weight demultiplexer Demux_W1 and a second weight demultiplexer Demux_W2. In addition, the input activation demultiplexer Dx_I may include a first input activation demultiplexer Demux_I1 and a second input activation demultiplexer Demux_I2.

The first weight demultiplexer Demux_W1 may receive the first path determination signal PD1 and the first sub-weight W0 of one of the first precision Pr1 and the second precision Pr2. In addition, the second weight demultiplexer Demux_W2 may receive the second path determination signal PD2 and the second sub-weight W1 of one of the first precision Pr1 and the second precision Pr2.

Similarly, the first input activation demultiplexer Demux_I1 may receive the first path determination signal PD1 and the first sub-input activation IN0 of one of the first precision Pr1 and the second precision Pr2. In addition, the second input activation demultiplexer Demux_I2 may receive the second path determination signal PD2 and the second sub-input activation IN1 of one of the first precision Pr1 and the second precision Pr2.

In this case, the first path determination signal PD1 and the second path determination signal PD2 may be independently generated. In other words, the first path determination signal PD1 may be generated based on the calculation mode signal Mode, the first sub-weight W0, and the first sub-input activation IN0, and the second path determination signal PD2 may be generated based on the calculation mode signal Mode, the second sub-weight W1, and the second sub-input activation IN1.

When the calculation mode signal Mode is associated with the first precision Pr1, the path selection logic PSL may generate the path determination signal PD1 based on sizes of the first sub-weight W0 and the first sub-input activation IN0. For example, when a size of at least a part of the first sub-weight W0 and the first sub-input activation IN0 is greater than the greatest value of the second precision Pr2, the path selection logic PSL may generate a first signal as the first path determination signal PD1.

Meanwhile, when a size of each of the first sub-weight W0 and the first sub-input activation IN0 is less than or equal to the greatest value of the second precision Pr2, the path selection logic PSL may generate a second signal as the first path determination signal PD1.

When the calculation mode signal Mode is associated with the second precision Pr2, the path selection logic PSL may generate the second signal as the first path determination signal PD1.

Independently of this, when the calculation mode signal Mode is associated with the first precision Pr1, the path selection logic PSL may generate the second path determination signal PD2 based on sizes of the second sub-weight W1 and the second sub-input activation IN1. For example, when a size of at least a part of the second sub-weight W1 and the second sub-input activation IN1 is greater than the greatest value of the second precision Pr2, the path selection logic PSL may generate a first signal as the second path determination signal PD2.

Meanwhile, when a size of each of the second sub-weight W1 and the second sub-input activation IN1 is less than or equal to the greatest value of the second precision Pr2, the path selection logic PSL may generate a second signal as the second path determination signal PD2.

When the calculation mode signal Mode is associated with the second precision Pr2, the path selection logic PSL may generate the second signal as the second path determination signal PD2. That is, the first path determination signal PD1 and the second path determination signal PD2 may be independently generated.

For example, it is assumed that the first precision Pr1 is INT4, the second precision Pr2 is INT2, the weight Weight is '00100101', and the input activation Act_In is '00010001'.

Referring to FIGS. 15 and 16, when the calculation mode signal Mode is INT4, the bit division logic BDL may divide the weight Weight into INT4 units in response to the calculation mode signal Mode to generate the first sub-weight W0 and the second sub-weight W1. In this case, the first sub-weight W0 may be '0010', and the second sub-weight W1 may be '0101'. Similarly, the bit division logic BDL may divide the input activation Act_In into INT4 units to generate the first sub-input activation IN0 and the second sub-input activation IN1. In this case, the first sub-input activation IN0 may be '0001', and the second sub-input activation IN1 may be '0001'.

The path selection logic PSL may determine the first path determination signal PD1 as any one of the first signal and the second signal according to sizes of the first sub-weight W0 and the first sub-input activation IN0.

The path selection logic PSL may output 1 (the second signal) as the first path determination signal PD1 because two high-order bits of each of the first sub-weight W0 and the first sub-input activation IN0 that are each INT4 are all 0.

The conversion logic CVL may convert the first sub-weight W0 ('0010') and the first sub-input activation IN0 ('0001') that are each INT4 into the first sub-weight W0' ('10') and the first sub-input activation IN0' ('01') that are each INT2, respectively.

The conversion logic CVL may provide the converted first sub-weight W0' of INT2 to the first weight demultiplexer Demux_W1 and provide the converted first sub-input activation IN0' of INT2 to the first input activation demultiplexer Demux_I1.

The first weight demultiplexer Demux_W1 may provide the converted first sub-weight W0' of INT2 to the second multiplier Mul2 in response to the first path determination signal PD1. In addition, the first input activation demultiplexer Demux_I1 may provide the converted first sub-input activation IN0' of INT2 to the second multiplier Mul2 in response to the first path determination signal PD1.

Meanwhile, the path selection logic PSL may output 0 (the first signal) as the second path determination signal PD2 because the second high-order bit of the second sub-weight W1 of INT4 is 1.

In this case, the second sub-weight W1 ('0101') of INT4 may be provided to the second weight demultiplexer Demux_W2, and the second sub-input activation IN1 ('0001') of INT4 may be provided to the second input activation demultiplexer Demux_I2.

The second weight demultiplexer Demux_W2 may provide the second sub-weight W1 of INT4 to the first multiplexer Mul1 in response to the second path determination signal PD2, and the second input activation demultiplexer Demux_I2 may provide the second sub-input activation IN1 of INT4 to the first multiplier Mul1 in response to the second path determination signal PD2.

In other words, calculation of the first sub-weight W0 and the first sub-input activation IN0 may be performed by the second multiplier Mul2, and calculation of the second sub-weight W1 and the second sub-input activation IN1 may be performed by the first multiplier Mul1. However, FIG. 16 is only an example for implementing the path selection logic PSL configured for the sake of convenience of description, and embodiments are not limited to the configuration.

According to some other embodiments of the present disclosure, a plurality of path determination signals PD may be generated based on each pair of the plurality of sub-weights W0, W1, . . . and the plurality of sub-input activations IN0, IN1, . . . . That is, even with the same weight Weight and input activation Act_In, calculation of some of the sub-weight Weight and the sub-input activations Act_In may be performed along the first path Path #1, and calculation of the others of the sub-weights Weight and the sub-input activations Act_In may be performed along the second path Path #2. As described above, power consumption of the second multiplier Mul2 is less than power consumption of the first multiplier Mul1, and thus, according to some other embodiments of the present disclosure, calculation of some of the sub-weights Weight and the sub-input activations Act_In may be performed by the second multiplier Mul2 such that power consumption may be further reduced.

Figure 17:
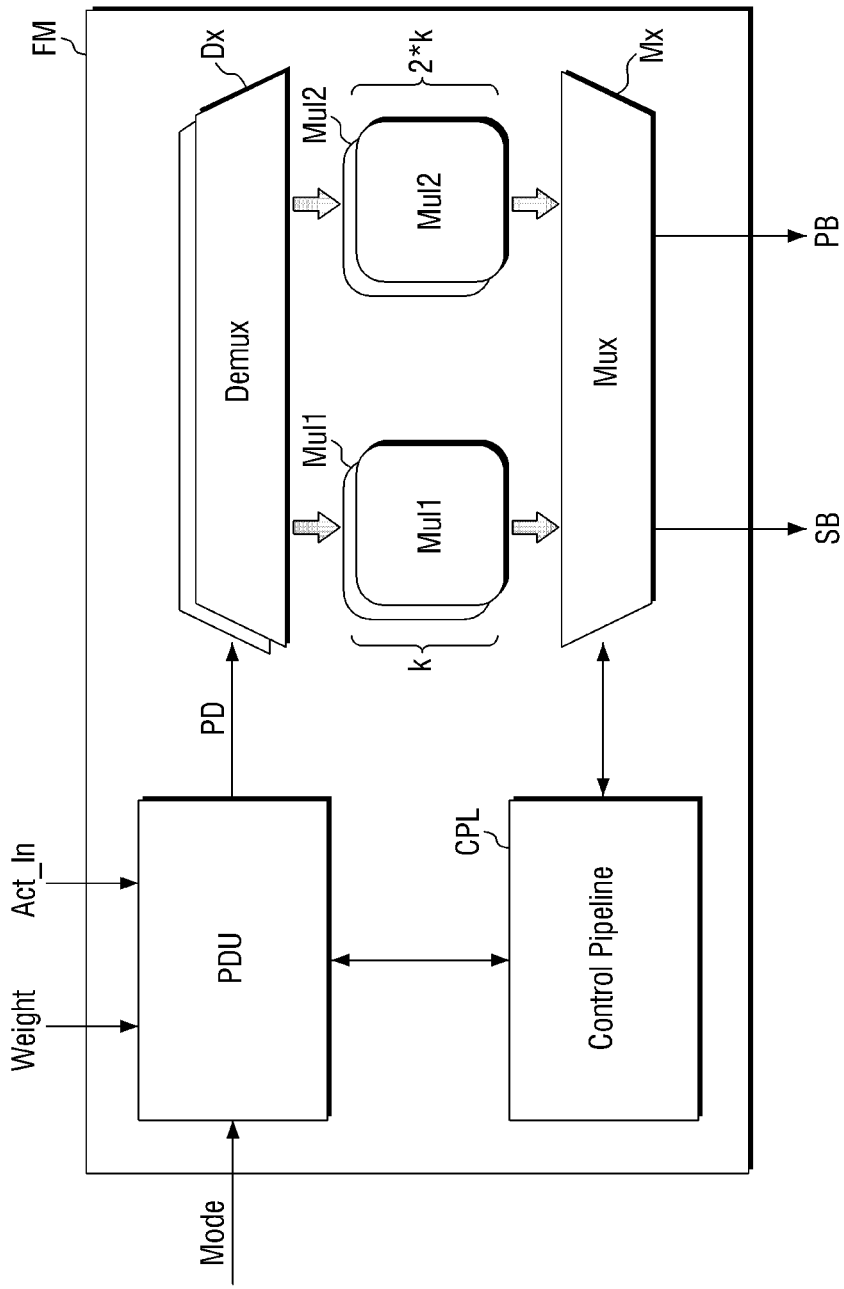
FIG. 17 is a diagram illustrating a configuration of a flexible multiplier according to some other embodiments of the present disclosure.

FIG. 17 is a diagram illustrating a configuration of a flexible multiplier according to some other embodiments of the present disclosure. For the sake of convenience of description, contents that are the same as or similar to the contents described above will be omitted or simply described.

Referring to FIG. 17, the flexible multiplier FM may include a control pipeline CPL. The control pipeline CPL may perform a function of synchronizing an input and an output of the flexible multiplier FM. For example, when all calculations of the first multiplier Mul1 or the second multiplier Mul2 are performed in one cycle, the control pipeline CPL may not operate. Meanwhile, when flip-flop occurs in calculation of the first multiplier Mul1 or the second multiplier Mul2 (when calculation is delayed), a result of the calculation of the first multiplier Mul1 or the second multiplier Mul2 may be output in the next cycle. In this case, in order to synchronize an input of the flexible multiplier FM with an output thereof, the control pipeline CPL may temporarily block an input to the path determination unit PDU until the calculation of the first multiplier Mul1 or the second multiplier Mul2 is completed.

Figure 18:
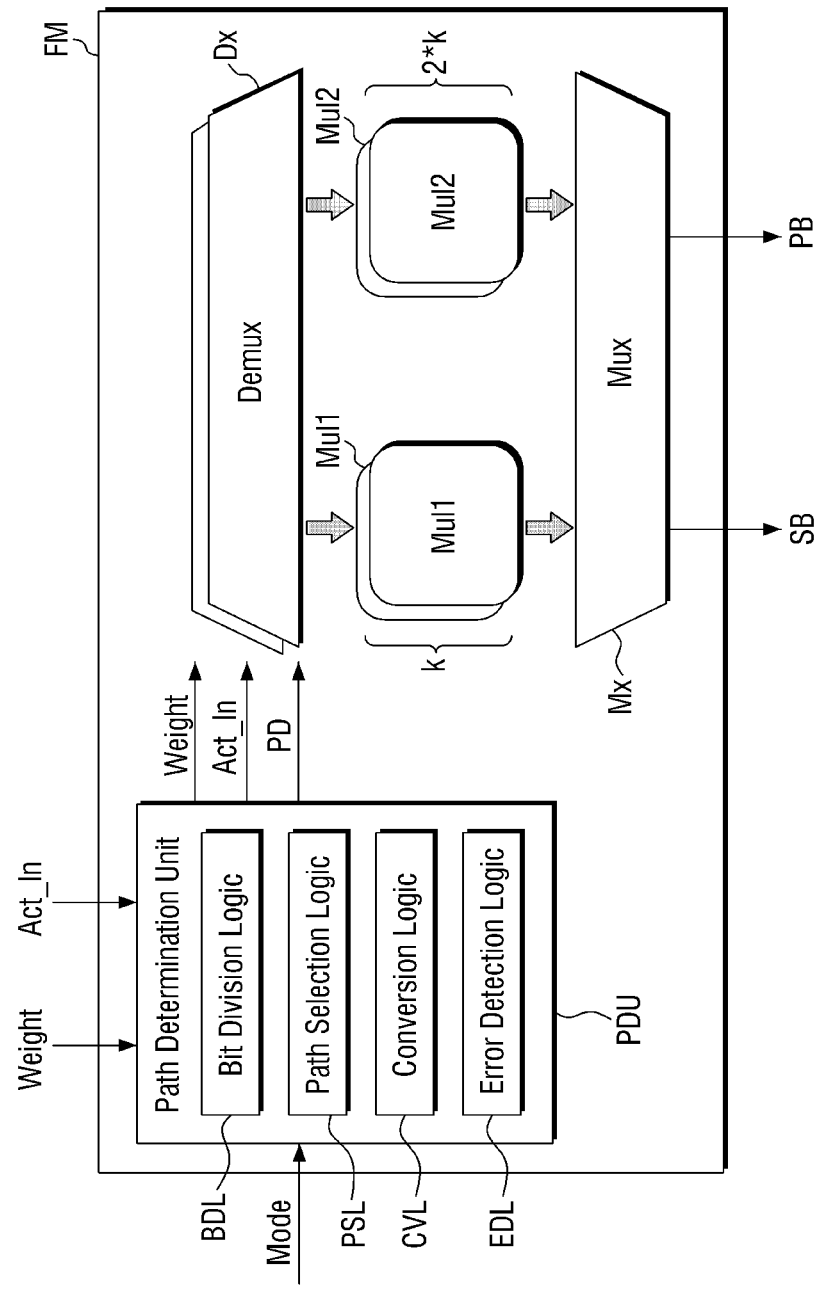
FIG. 18 is a diagram illustrating a configuration of a flexible multiplier according to some other embodiments of the present disclosure.

FIG. 18 is a diagram illustrating a configuration of a flexible multiplier according to some other embodiments of the present disclosure. For the sake of convenience of description, contents that are the same as or similar to the contents described above will be omitted or simply described.

Referring to FIG. 18, the path determination unit PDU may further include an error detection logic EDL. The error detection logic EDL may detect whether overflow or underflow occurs as a result of performing logical operation of the weight Weight and the input activation Act_In. In this case, the overflow may be an error that occurs when a numerical range of the result is greater than a numerical range according to precision of data, and the underflow may be an error that occurs when the numerical range is less than the numerical range according to the precision of data.

When the calculation mode signal Mode is associated with the first precision Pr1 and the path selection logic PSL generates the second signal as the path determination signal PD, the conversion logic CVL may convert the weight Weight and the input activation Act_In of the first precision Pr1 into the weight Weight and the input activation Act_In of the second precision Pr2.

In this case, the error detection logic EDL may detect whether an overflow error or an underflow error occurs in the weight Weight and the input activation Act_In converted into the second precision Pr2. When an overflow error or an underflow error occurs in the weight Weight and the input activation Act_In converted into the second precision Pr2, the error detection logic EDL may provide an error generation signal to the path selection logic PSL. The path selection logic PSL may change the path determination signal PD into the first signal when the error generation signal is received.

For example, it is assumed that the weight Weight and the input activation Act_In are each '0011' of INT4. First, the path selection logic PSL may generate the path determination signal PD as a second signal based on sizes of the weight Weight and the input activation Act_In. In this case, the conversion logic CVL may convert '0011' of INT4 into '11' of INT2.

In this case, when '11' of INT2 expresses a decimal number of 9, a decimal number of 81 is obtained by performing multiplication calculation of '11' of INT2 and '11' of INT2 and cannot be expressed as INT4 of four bits, and thereby, overflow may occur. In this case, the decimal number 81 may be clearly expressed through a multiplication calculation result of INT8 by converting again '11' into '0011' of INT4.

Accordingly, the error detection logic EDL may detect the overflow and provide an error generation signal to the path selection logic PSL, and the path selection logic PSL may generate the path determination signal PD as the first signal again.

As a result, when an overflow error or an underflow error is detected in the error detection logic EDL, the weight Weight and the input activation Act_In of the first precision Pr1 may be provided to the demultiplexer Dx, and the demultiplexer Dx may provide the weight Weight and the input activation Act_In of the first precision Pr1 to the first multiplier Mul1 in response to the path determination signal PD.

According to some embodiments of the present disclosure, it is described that the error detection logic EDL determines whether an overflow error or an underflow error occurs, after the weight Weight and the input activation Act_In of the first precision Pr1 are converted into the second precision Pr2, but the embodiments are not limited thereto. For example, when the weight Weight and the input activation Act_In of the first precision Pr1 are converted into the weight Weight and the input activation Act_In of the second precision Pr2, the error detection logic EDL may detect in advance whether an overflow error or an underflow error occurs. In this case, a range of input data of the error detection logic EDL is extended to the first precision Pr1, but there is an advantage in that there is no need for the conversion logic CVL to convert the weight Weight and the input activation Act_In of the first precision Pr1 into the weight Weight and the input activation Act_In of the second precision Pr2, and thus, time and a procedure may be simpler.

Meanwhile, even when the calculation mode signal Mode is associated with the second precision Pr2, the error detection logic EDL may detect an overflow error or an underflow error to generate an error generation signal. When the error generation signal is generated, the conversion logic CVL may convert the weight Weight and the input activation Act_In of the second precision Pr2 into the first precision Pr1. In addition, the path selection logic PSL may generate the first signal as the path determination signal PD. The weight Weight and the input activation Act_In converted into the first precision Pr1 may be provided to the demultiplexer Dx, and the demultiplexer Dx may provide the weight Weight and the input activation Act_In converted into the first precision Pr1 to the first multiplier Mul1 in response to the path determination signal PD.

Therefore, according to the present embodiment, when overflow or underflow occurs, conversion for increasing the number of bits of data by changing a precision may be performed. Through this, a small number of bits with high efficiency are used at normal times, and when calculation may be inaccurate, the small number of bits are converted into a large number of bits, and thus, optimal efficiency may be maintained and degree of precision of calculation may be increased.

In particular, INT2 has a narrow range to generate frequent quantization, and thus, the overflow or underflow may occur very frequently. INT2 has high data efficiency due to a small number of bits, and thus, INT2 may be very useful in a case where hardware resources such as mobile devices are limited. Therefore, according to the present embodiment, it is possible to prevent a decrease in accuracy due to overflow or underflow which frequently occurs in a region where a precision of a small number of bits such as INT2 is used.

Figure 19:
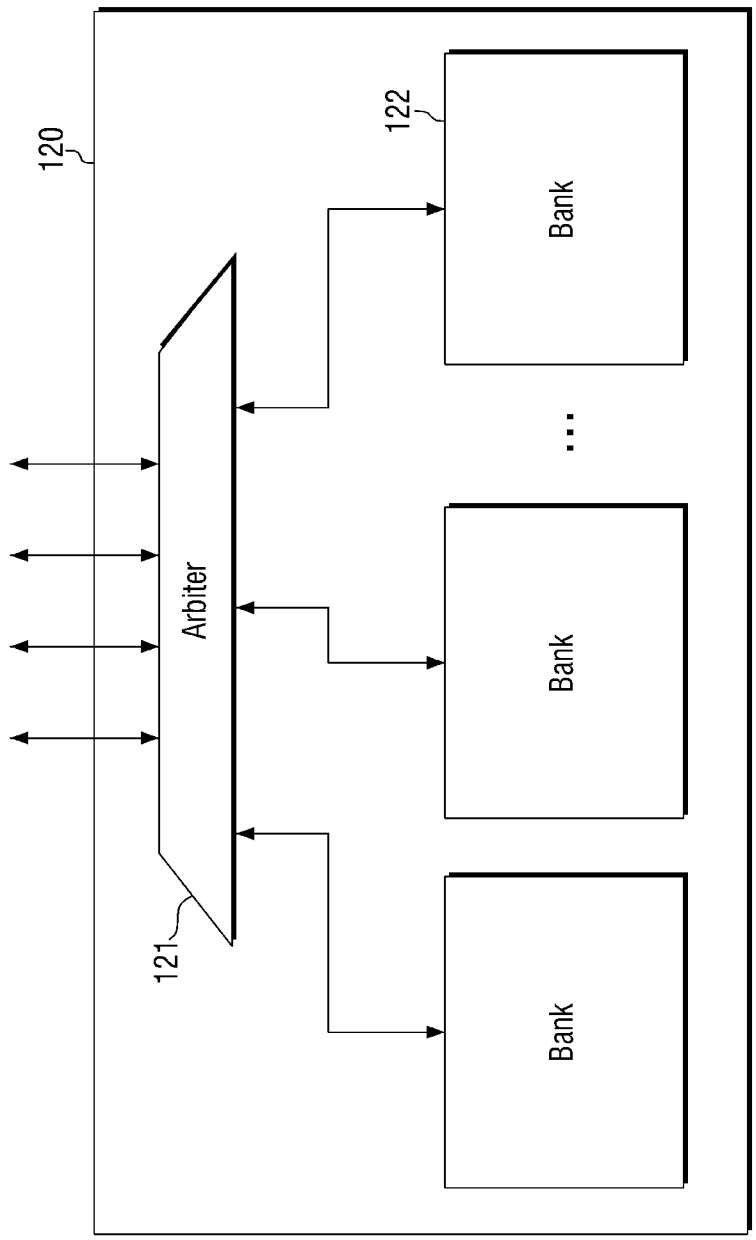
FIG. 19 is a block diagram for illustrating in detail the L0 memory of FIG. 7.

FIG. 19 is a block diagram for illustrating in detail the L0 memory of FIG. 7.

With reference to FIG. 19, the L0 memory 120 may include an arbiter 121 and at least one local memory bank 122.

When data is stored in the L0 memory 120, the arbiter 121 may receive the data from the load engine 113a. At this time, the local memory banks 122 may be allocated to the data in a round robin fashion. Accordingly, the data may be stored in any one of the at least one local memory bank 122.

Conversely, when the data is loaded from the L0 memory 120, the arbiter 121 may receive the data from the local memory bank 122 and transmit them to the store engine 113b. The store engine 113b may store data externally via the local interconnection 200.

Figure 20:
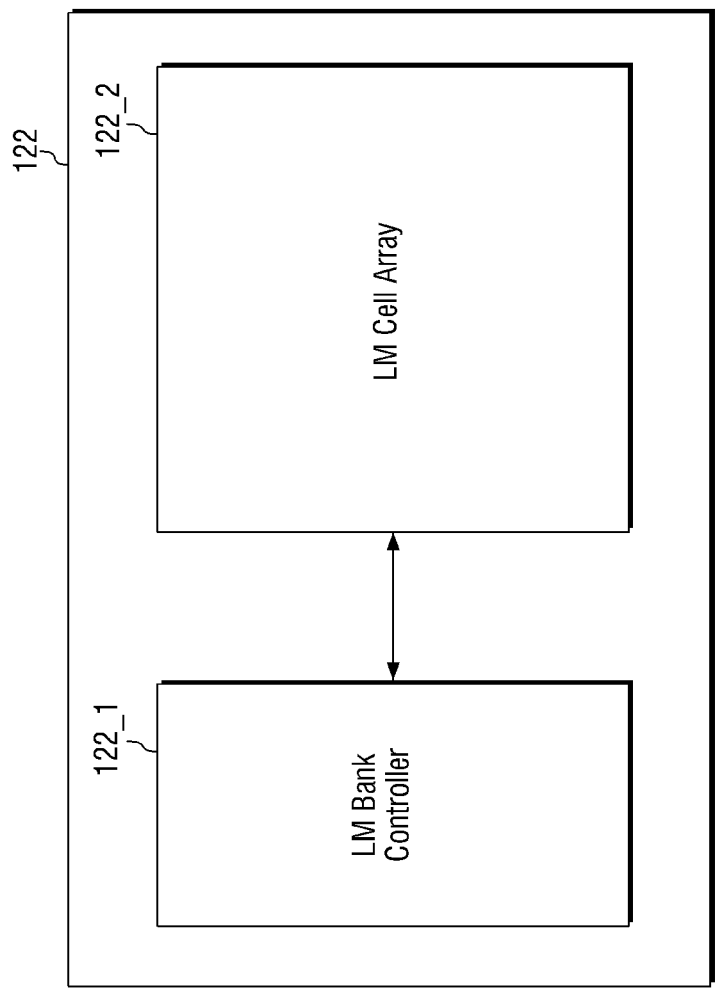
FIG. 20 is a block diagram for illustrating in detail the local memory bank of FIG. 19.

FIG. 20 is a block diagram for illustrating in detail the local memory bank of FIG. 19.

With reference to FIG. 20, the local memory bank 122 may include a local memory bank controller 122_1 and a local memory bank cell array 122_2.

The local memory bank controller 122_1 may manage read and write operations via the addresses of data stored in the local memory bank 122. That is, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 21:
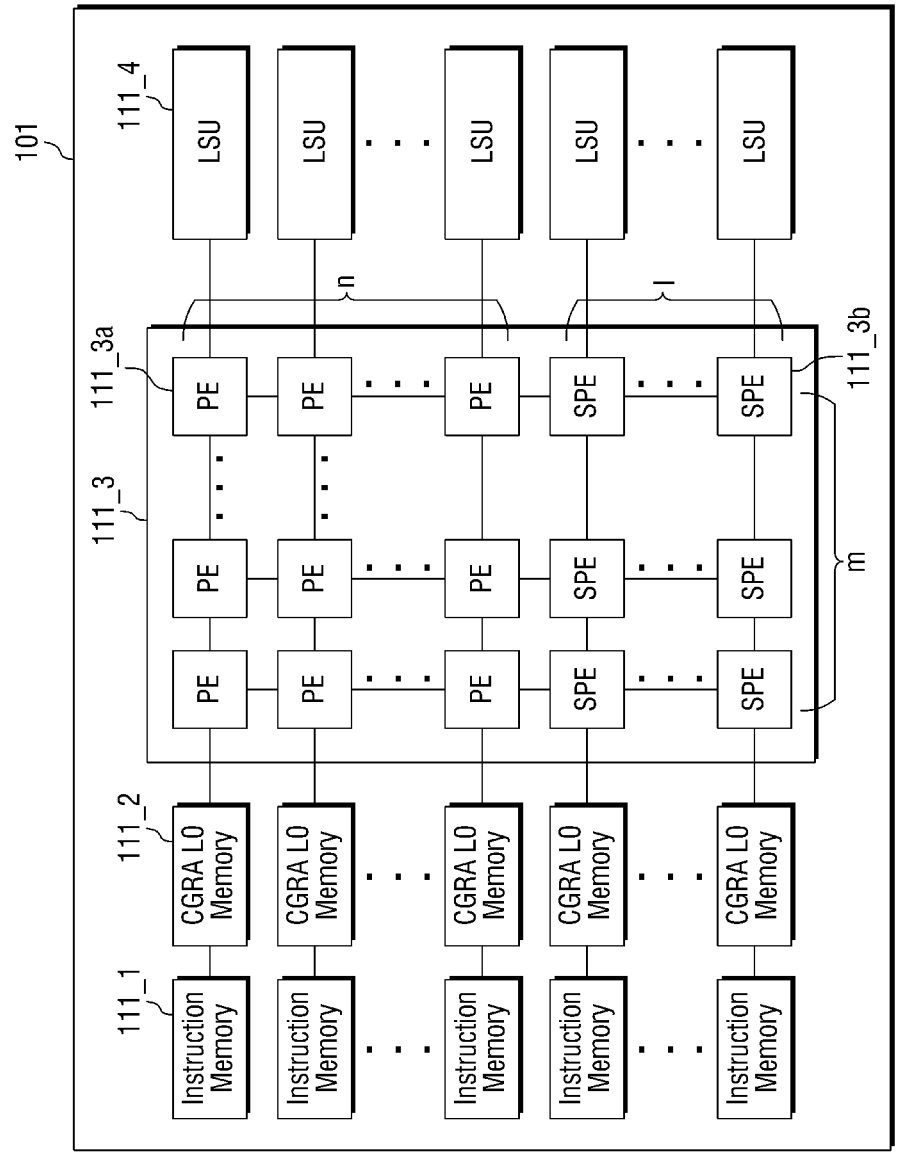
FIG. 21 is a block diagram for illustrating in detail the structure of a neural processing device in accordance with some embodiments of the present disclosure.

FIG. 21 is a block diagram for illustrating in detail the structure of a neural processing device in accordance with some embodiments of the present disclosure.

Referring to FIG. 21, the neural core 101 may be of a CGRA structure, unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store instructions internally, and provide the stored instructions to the PE array 111_3. In this case, the instructions may instruct the operation of the processing element 111_3a included in each PE array 111_3.

The CGRA L0 memory 111_2 is a memory located inside the neural core 101, and may receive all the input data required for the tasks by the neural core 101 from the outside and temporarily store them. Further, the CGRA L0 memory 111_2 may temporarily store the output data calculated by the neural core 101 in order to transmit them to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include a plurality of processing elements 111_3a and particular processing elements 111_3b therein.

The processing elements 111_3a and the particular processing elements 111_3b may be arranged in rows and columns. The processing elements 111_3a and the particular processing elements 111_3b may be arranged in m columns. Further, the processing elements 111_3a may be arranged in n rows, and the particular processing elements 111_3b may be arranged in l rows. Accordingly, the processing elements 111_3a and the particular processing elements 111_3b may be arranged in (n+1) rows and m columns.

The LSU 111_4 may receive at least one of data, a control signal, and a synchronization signal from the outside via the L1 interconnection 130. The LSU 111_4 may transmit at least one of the received data, control signal, and synchronization signal to the CGRA L0 memory 111_2. Similarly, the LSU 111_4 may transmit at least one of the data, control signal, and synchronization signal to the outside via the L1 interconnection 130.

The neural core 101 may have a CGRA (Coarse Grained Reconfigurable Architecture) structure. Accordingly, in the neural core 101, the respective processing elements 111_3a and particular processing elements 111_3b of the PE array 111_3 may be connected to at least one of the CGRA L0 memory 111_2, the instruction memory 111_1, and the LSU 111_4, respectively. In other words, the processing elements 111_3a and the particular processing elements 111_3b do not have to be connected to all of the CGRA L0 memory 111_2, the instruction memory 111_1, and the LSU 111_4, but may be connected to some of them.

Further, the processing elements 111_3a and the particular processing elements 111_3b may be different types of processing elements from each other. Accordingly, out of the CGRA L0 memory 111_2, the instruction memory 111_1, and the LSU 111_4, the elements connected to the processing elements 111_3a and the elements connected to the particular processing elements 111_3b may be different from each other.

The neural core 101 of the present disclosure having a CGRA structure enables high-level parallel calculations, and since direct data exchange between the processing elements 111_3a and the particular processing elements 111_3b is possible, the power consumption may be low. In addition, by including two or more types of processing elements 111_3a, optimization according to various calculation tasks may be possible.

For example, if the processing elements 111_3a are processing elements that perform two-dimensional calculations, the particular processing elements 111_3b may be processing elements that perform one-dimensional calculations. However, the present embodiment is not limited thereto.

Figure 22:
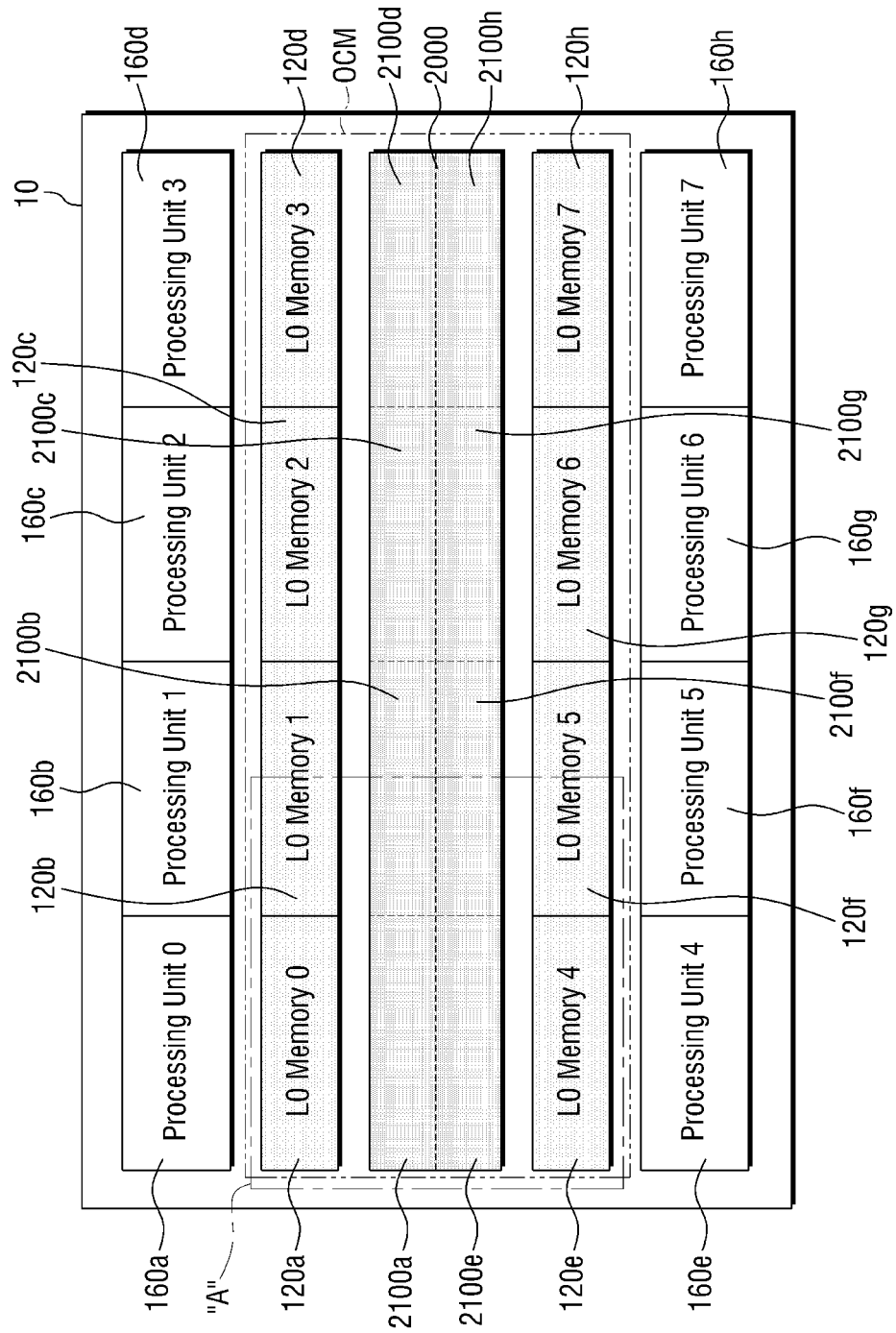
FIG. 22 is a block diagram for illustrating memory reconfiguration of a neural processing system in accordance with some embodiments of the present disclosure.

FIG. 22 is a block diagram for illustrating memory reconfiguration of a neural processing system in accordance with some embodiments of the present disclosure.

Figure 26:
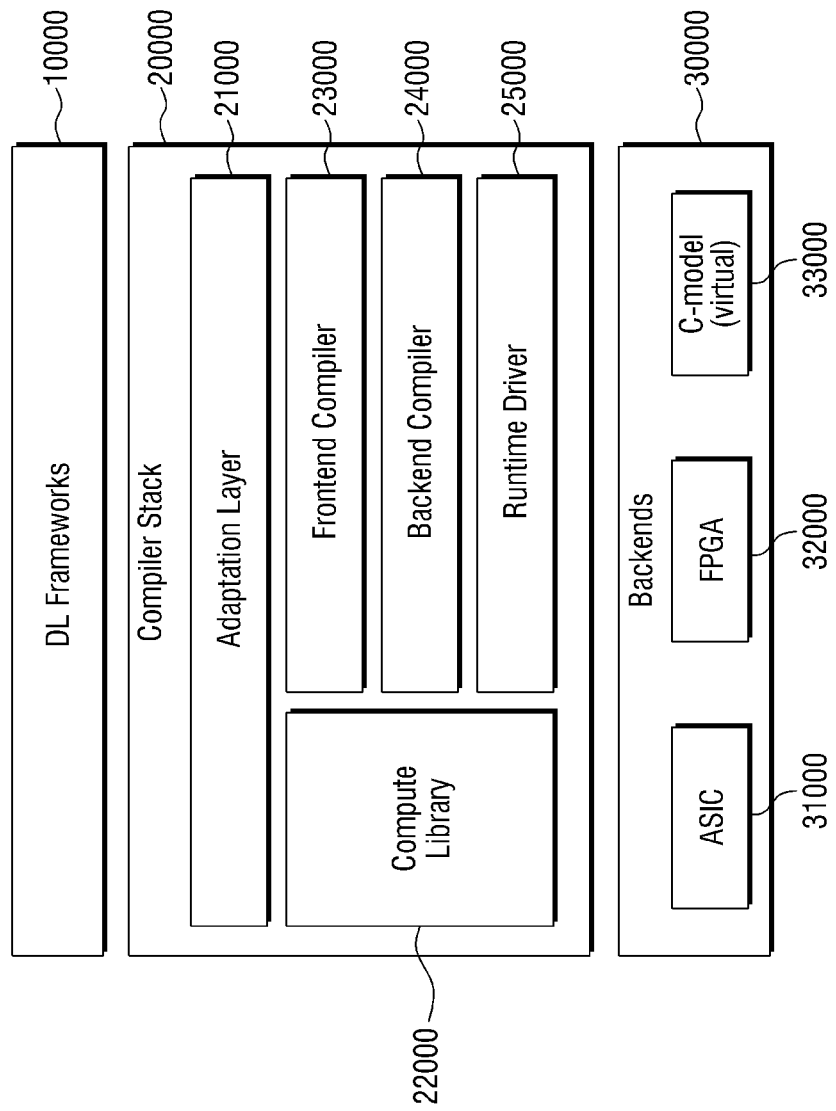
FIG. 26 is a block diagram for illustrating a software hierarchy of a neural processing device in accordance with some embodiments of the present disclosure.

With reference to FIG. 22, the neural core SoC 10 may include first to eighth processing units 160a to 160h and an on-chip memory OCM. Although FIG. 26 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 100a and the second processing unit 100b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 5000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 23:
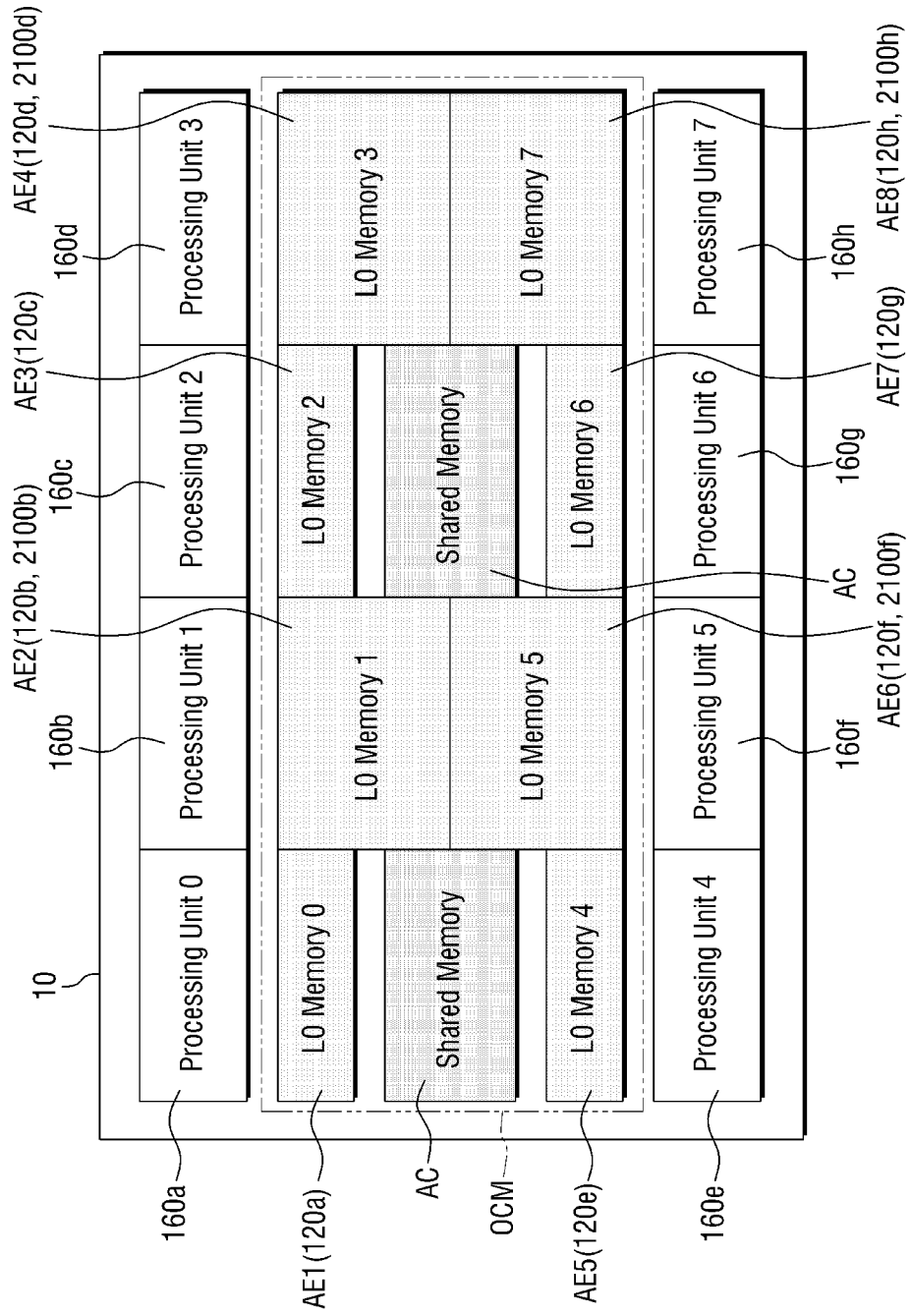
FIG. 23 is a block diagram showing an example of memory reconstruction of a neural processing system in accordance with some embodiments of the present disclosure.

FIG. 23 is a block diagram showing an example of memory reconstruction of a neural processing system in accordance with some embodiments of the present disclosure.

With reference to FIGS. 20 and 21, first, third, fifth, and seventh dedicated areas AE1, AE3, AE5, and AE7 for each of the first, third, fifth, and seventh processing units 100a, 100c, 100e, and 100g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 100b, 100d, 100f, and 100h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the present embodiment may convert an area corresponding to each neural core into a logical L0 memory and a logical global memory of an optimized ratio and may use them. The shared memory 2000 may perform the adjustment of this ratio at runtime.

That is, each neural core may perform the same task in some cases, but may perform different tasks in other cases as well. In this case, the amount of the L0 memory and the amount of the global memory required for the tasks carried out by each neural core are inevitably different each time. Accordingly, if the composition ratio of the L0 memory and the shared memory is fixedly set as in the conventional on-chip memory, there may occur inefficiency due to the calculation tasks assigned to each neural core.

Therefore, the shared memory 2000 of the neural processing device in accordance with the present embodiment may set an optimal ratio of the L0 memory and the global memory according to calculation tasks during the runtime, and may enhance the efficiency and speed of calculation.

Figure 24:
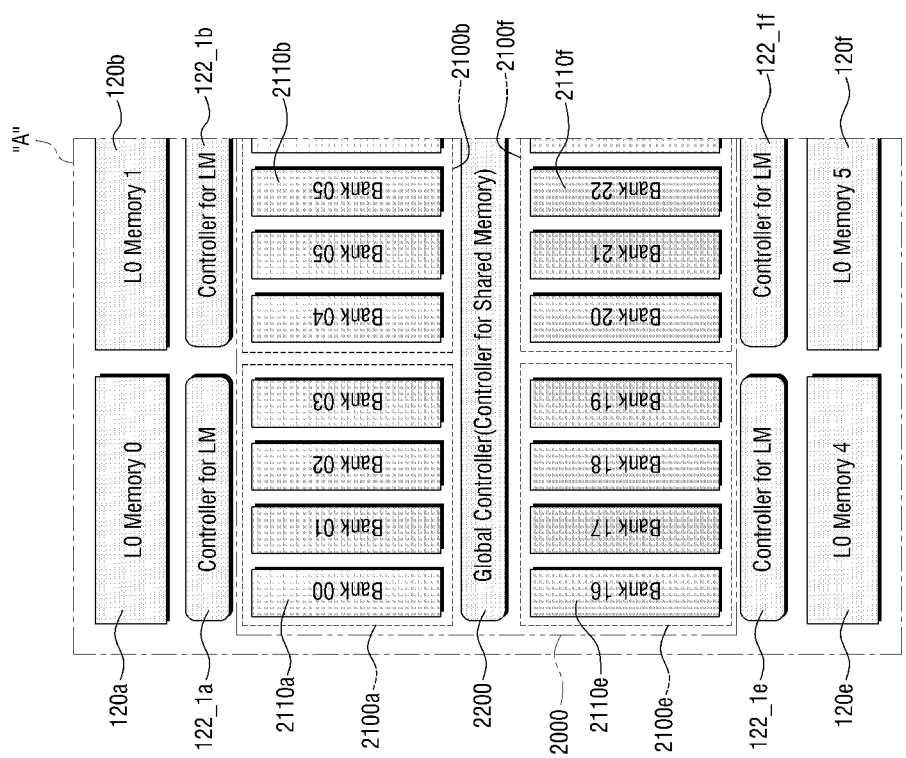
FIG. 24 is an enlarged block diagram of a portion A of FIG. 22.

FIG. 24 is an enlarged block diagram of a portion A of FIG. 22.

With reference to FIGS. 20 and 22, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the present embodiment, but the description thereof will be omitted for convenience.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented in.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 141h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. However, the present embodiment is not limited thereto.

The global controller 2200 may connect the first to eighth memory units 2100a to 2100h with the global interconnection 5000 of FIG. 3. The first to eighth memory units 2100a to 2100h may exchange data with the off-chip memory 30 of FIG. 1 or may exchange data with the first to eighth L0 memories 120a to 120h, respectively, by means of the global controller 2200.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The respective first memory banks 2110a may all be memory devices of the same size. However, the present embodiment is not limited thereto. FIG. 15 illustrates that four memory banks are included in one memory unit.

Likewise, the second, fifth, and sixth memory units 2100b, 2100e, and 2100f may include at least one second, fifth, and sixth memory banks 2110b, 2110e, and 2110f, respectively.

Hereinafter, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the present embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may occupy the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may occupy the entire first memory unit 2100a.

In this case, the ratio of the first area to the second area may be different from the ratio of the third area to the fourth area. However, the present embodiment is not limited thereto. Accordingly, the ratio of the first area to the second area may be the same as the ratio of the third area to the fourth area. In other words, the memory composition ratio in each memory unit may vary as desired.

In general, in the case of the conventional system on a chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly inevitably in the case of tasks that require more data quickly than the predetermined capacity of the L0 memory, and even when the need for the global memory is not great, there is no way to utilize the remaining global memory, resulting in inefficiency.

On the contrary, the shared memory 2000 in accordance with some embodiments of the present disclosure may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 in accordance with the present embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000 in accordance with the present embodiment, the composition ratio of the memory can be changed during the runtime even when calculation steps change according to each layer, making fast and efficient deep learning tasks possible.

Figure 25:
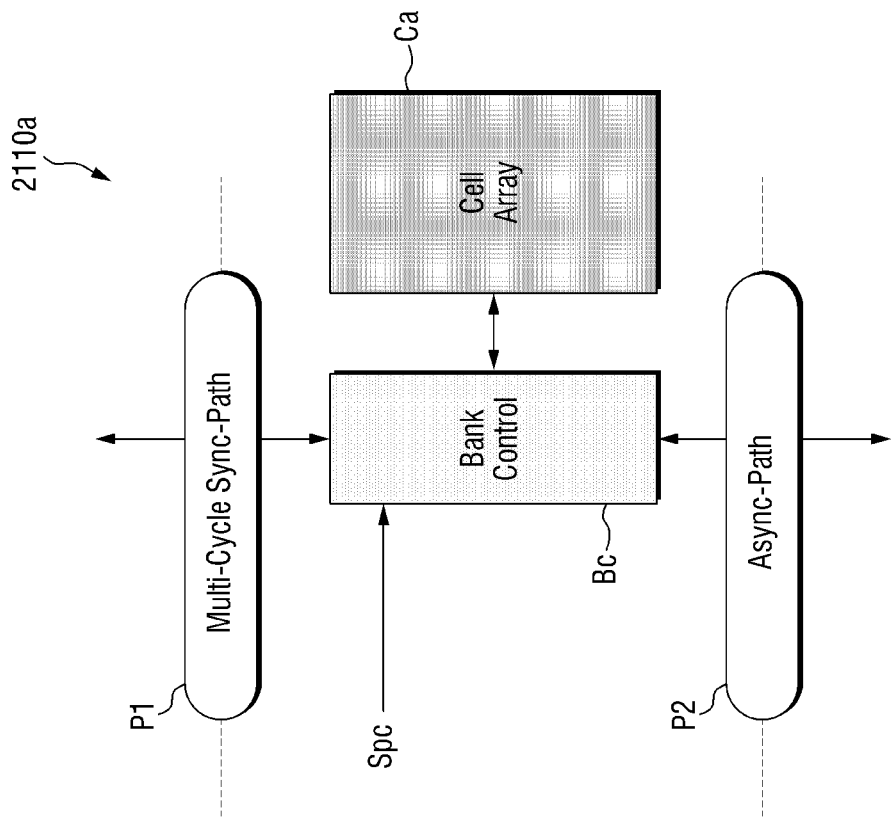
FIG. 25 is a diagram for illustrating in detail the first memory bank of FIG. 24.

FIG. 25 is a diagram for illustrating in detail the first memory bank of FIG. 24. Although FIG. 25 illustrates the first memory bank 2110a, other memory banks may also have the same structure as the first memory bank 2110a.

With reference to FIG. 25, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca accordingly.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. That is, the user may directly apply an input to the path control signal Spc in order to select the most optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. That is, a first interface may be used when the bank controller Bc exchanges data with the first path unit P1, and a second interface may be used when the bank controller Bc exchanges data with the second path unit P2. In this case, the first interface and the second interface may be different from each other.

Further, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 100a. In this case, "directly" may mean being exchanged with each other without going through the global interconnection 5000. In other words, the first processing unit 100a may exchange data directly with the first L0 memory 120a, and the first processing unit 100a may exchange data via the first path unit P1 when the shared memory 2000 is implemented logically in the L0 memory type. The first path unit P1 may include L0 memory controllers including the first L0 memory controller 122_1a and the second L0 memory controller 122_1b of FIG. 14.

The first path unit P1 may form a multi-cycle sync-path. That is, the operating clock frequency of the first path unit P1 may be the same as the operating clock frequency of the first processing unit 100a. The first L0 memory 120a may quickly exchange data at the same clock frequency as the operating clock frequency of the first processing unit 100a in order to quickly exchange data at the same speed as the operation of the first processing unit 100a. Likewise, the first path unit P1 may also operate at the same clock frequency as the operating clock frequency of the first processing unit 100a.

At this time, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 25, the operating clock frequency of the first path unit P1 may be 1.5 GHz as an example. This may be twice the frequency of 750 MHz of the bank controller Bc. However, the present embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 100a not directly but via the global interconnection 5000. In other words, the first processing unit 100a may exchange data with the cell array Ca via the global interconnection 5000 and the second path unit P2. In this case, the cell array Ca may exchange data not just with the first processing unit 100a but also with other neural cores.

That is, the second path unit P2 may be a data exchange path between the cell array Ca and all the neural cores when the first memory bank 2110a is implemented logically in the global memory type. The second path unit P2 may include the global controller 2200 of FIG. 14.

The second path unit P2 may form an Async-Path. The operating clock frequency of the second path unit P2 may be the same as the operating clock frequency of the global interconnection 5000. Likewise, the second path unit P2 may also operate at the same clock frequency as the operating clock frequency of the global interconnection 5000.

At this time, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be necessary. If the operating clock frequency of the bank controller Bc and the operating clock frequency of the second path unit P2 are not synchronized with each other, the degree of freedom in the design of the clock domain may be increased. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to be present for each memory bank. In other words, the bank controller Bc is not a part for scheduling but serves to transmit signals, and thus, is not an essential part for each memory bank having two ports. Therefore, one bank controller Bc can control multiple memory banks. The multiple memory banks may operate independently even if they are controlled by the bank controller Bc. However, the present embodiment is not limited thereto.

As a matter of course, the bank controller Bc may be present for each memory bank. In this case, the bank controller Bc may control each memory bank individually.

With reference to FIG. 24 and FIG. 25, if the first memory unit 210a exchanges data via the first path unit P1, the first address system may be used, and if the first memory unit 210a exchanges data via the second path unit P2, the second address system may be used. Likewise, if the second memory unit 210b exchanges data via the first path unit P1, a third address system may be used, and if the second memory unit 210b exchanges data via the second path unit P2, the second address system may be used. In this case, the first address system and the third address system may be the same as each other. However, the present embodiment is not limited thereto.

The first address system and the third address system may each be used exclusively for the first processing unit 100a and the second processing unit 100b, respectively. The second address system may be commonly applied to the first processing unit 100a and the second processing unit 100b.

In FIG. 25, the operating clock frequency of the second path unit P2 may operate at 1 GHz as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the contrary, the shared memory 2000 in accordance with some embodiments of the present disclosure has room to use the first path unit P1 in addition to the second path unit P2, thereby making it possible to avoid delays resulting from the CDC operation.

Furthermore, in the generic global memory, a plurality of neural cores use one global interconnection 5000, and thus, when an amount of data transfer occurs at the same time, the decrease in the overall processing speed is likely to occur. On the contrary, the shared memory 2000 in accordance with some embodiments of the present disclosure has room to use the first path unit P1 in addition to the second path unit P2, thereby making it possible to achieve the effect of properly distributing the data throughput that could be concentrated on the global controller 2200 as well.

FIG. 26 is a block diagram for illustrating a software hierarchy of a neural processing device in accordance with some embodiments of the present disclosure.

With reference to FIG. 26, the software hierarchy of the neural processing device in accordance with some embodiments of the present disclosure may include a DL framework 10000, a compiler stack 20000, and a back-end module 30000.

The DL framework 10000 may mean a framework for a deep learning model network used by a user. For example, a neural network that has finished training may be generated using programs such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. Moreover, the adaptation layer 21000 may convert the type of model into a required type.

The front-end compiler 23000 may convert various neural network models and graphs transferred from the adaptation layer 21000 into a certain intermediate representation IR. The converted IR may be a predetermined representation that is easy to handle later by the back-end compiler 24000.

The optimization that can be carried out in advance in the graph level may be performed on such an IR of the front-end compiler 23000. In addition, the front-end compiler 23000 may finally generate the IR via the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job in a scale that fits the details of hardware.

The compute library 22000 may store template operations designed in a form suitable for hardware among various operations. The compute library 22000 provides the back-end compiler 24000 with multiple template operations required by hardware, enabling the optimized code to be generated.

The runtime driver 25000 may continuously perform monitoring during driving, thereby making it possible to drive the neural network device in accordance with some embodiments of the present disclosure. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated via the compiler stack 20000.

Figure 27:
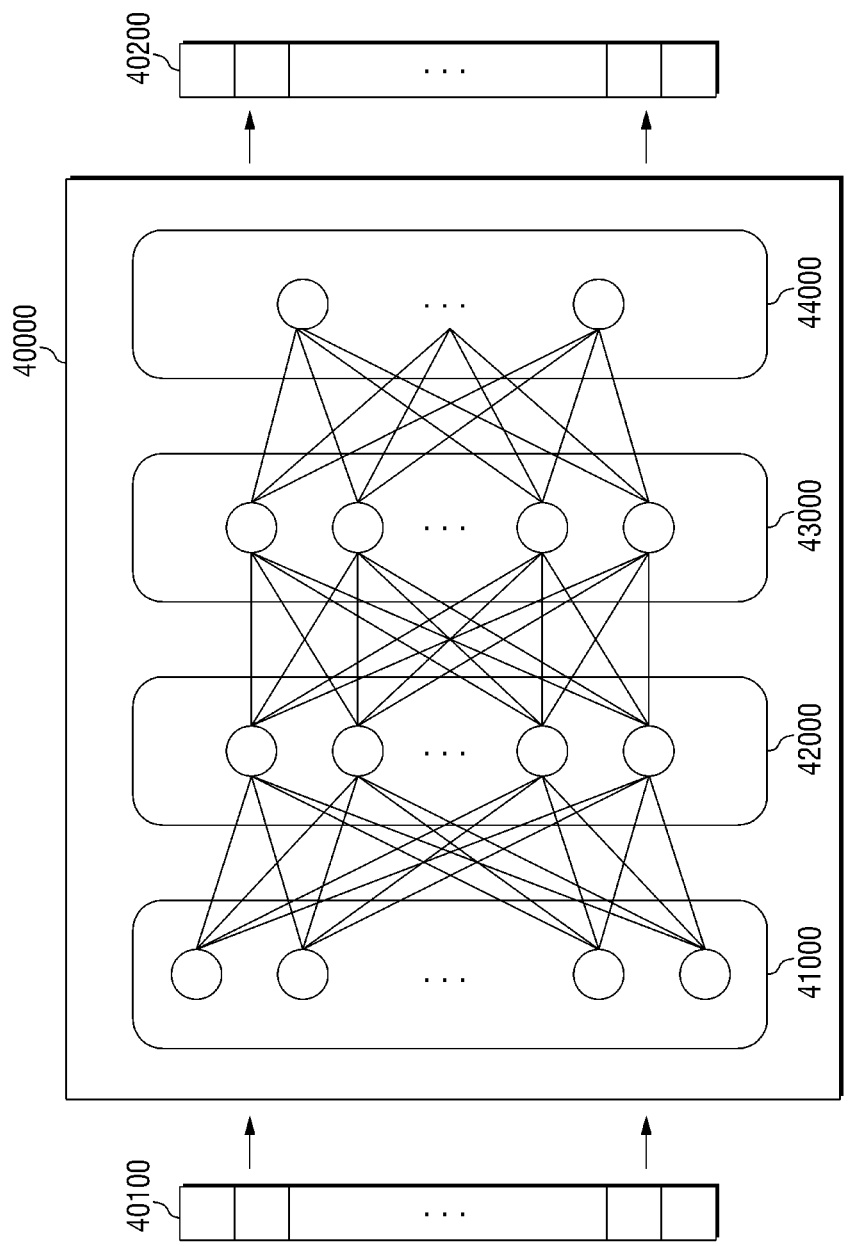
FIG. 27 is a conceptual diagram for illustrating deep learning calculations performed by a neural processing device in accordance with some embodiments of the present disclosure.

FIG. 27 is a conceptual diagram for illustrating deep learning calculations performed by a neural processing device in accordance with some embodiments of the present disclosure.

With reference to FIG. 27, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output and an inferred output corresponding to a particular input by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments of the present disclosure may implement the form of such an artificial neural network model 40000 and perform calculations. For example, the artificial neural network model 40000 may receive an input image, and may output information on at least a part of an object included in the input image.

The artificial neural network model 40000 is implemented by a multilayer perceptron (MLP) consisting of multilayer nodes and connections between them. An artificial neural network model 40000 in accordance with the present embodiment may be implemented using one of various artificial neural network model structures including the MLP. As shown in FIG. 15, the artificial neural network model 40000 consists of an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and transmit them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of teacher signals (correct answers), and an unsupervised learning method that does not require teacher signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 28:
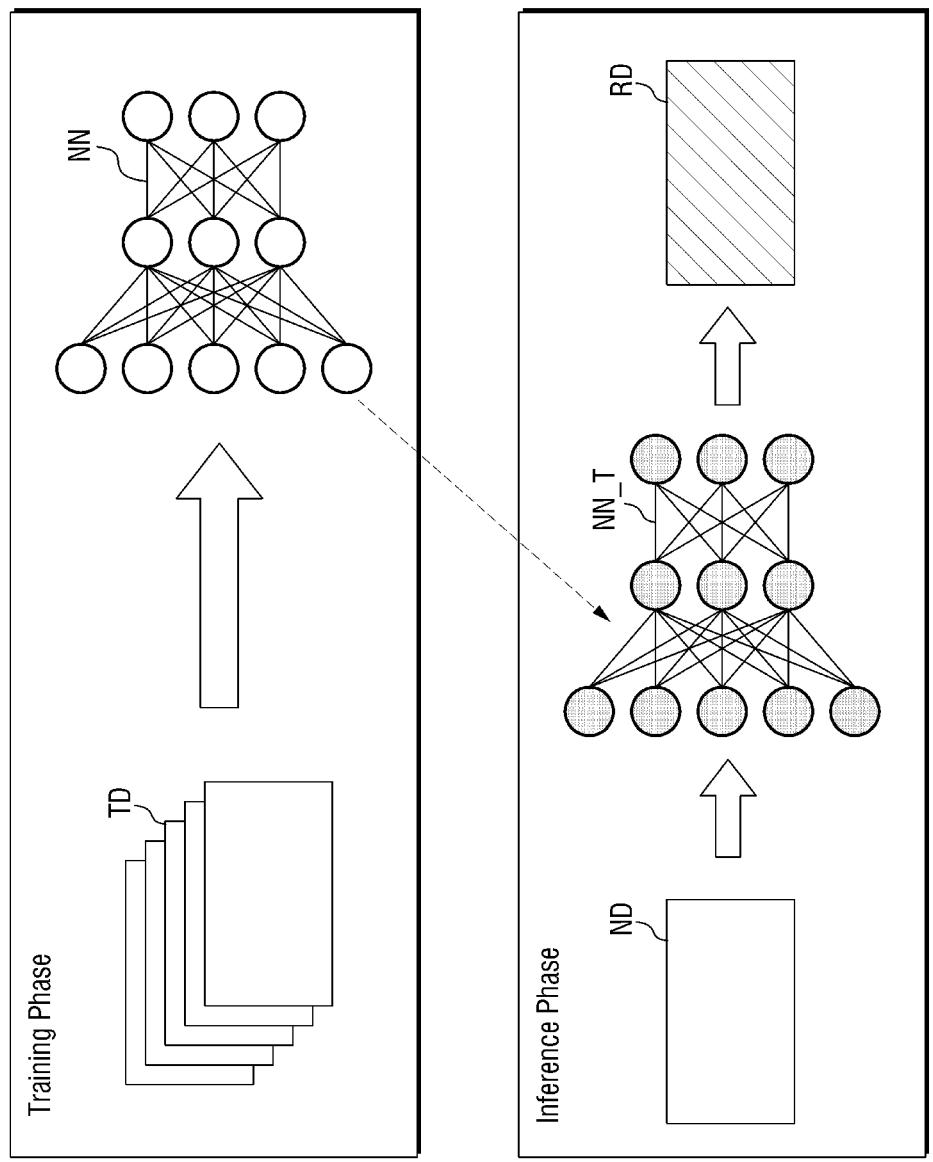
FIG. 28 is a conceptual diagram for illustrating training and inference operations of a neural network of a neural processing device in accordance with some embodiments of the present disclosure.

FIG. 28 is a conceptual diagram for illustrating training and inference operations of a neural network of a neural processing device in accordance with some embodiments of the present disclosure.

Referring to FIG. 28, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, it may be important what training data TD were used in training and how many pieces of training data TD were used, in the training phase.

Hereinafter, a calculation method of a neural processing device according to some embodiments of the present disclosure will be described with reference to FIGS. 11, 18, 29, and 30. Contents that are the same as or similar to the contents described above will be omitted or simply described.

Figure 29:
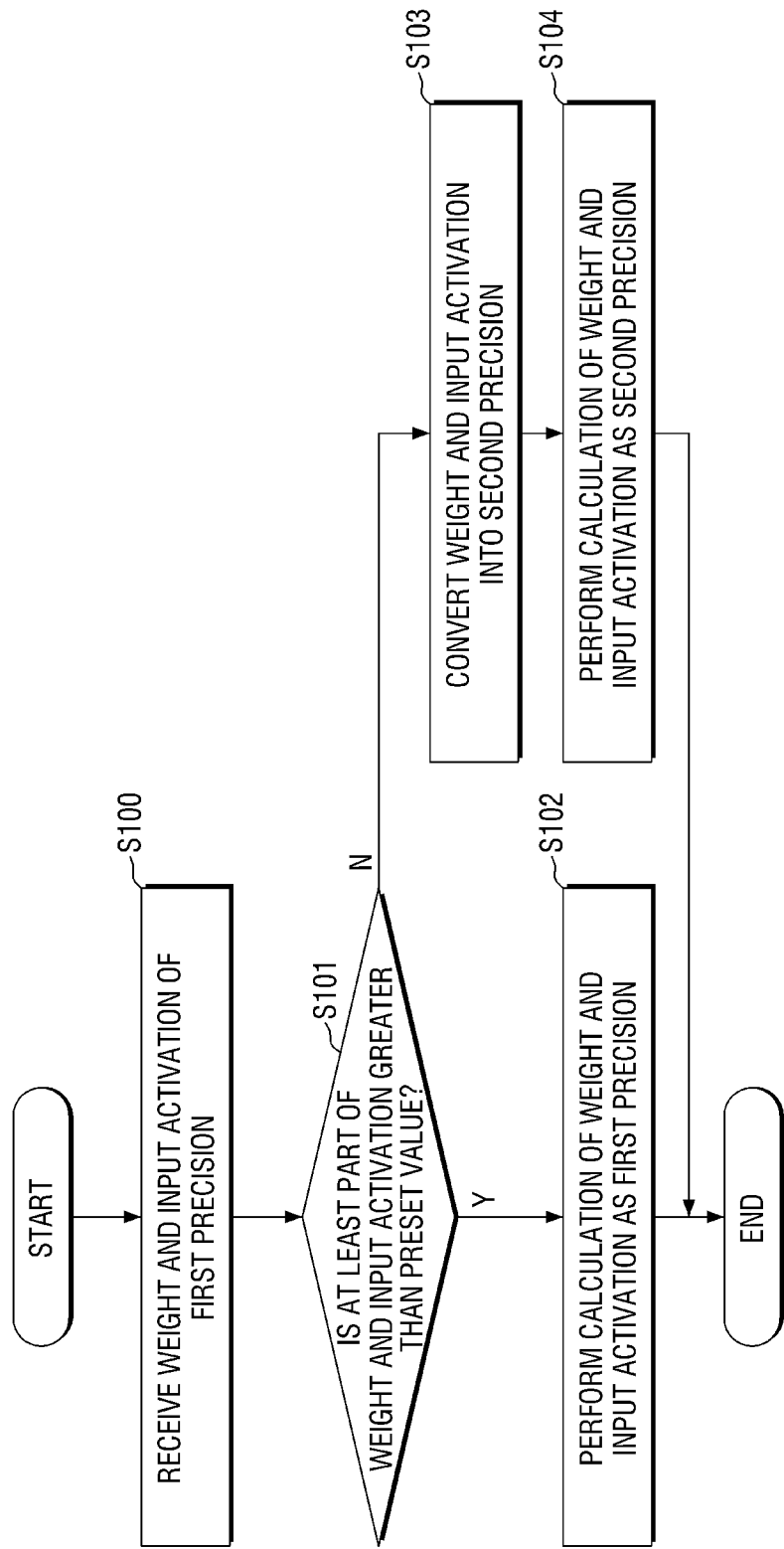
FIG. 29 is a diagram illustrating a calculation method of a neural processing device, according to some embodiments of the present disclosure.

FIG. 29 is a diagram illustrating a calculation method of a neural processing device, according to some embodiments of the present disclosure.

Referring to FIGS. 11 and 29, the weight Weight and the input activation Act_In of the first precision Pr1 may be received (S100). According to some embodiments, the path determination unit PDU may receive the calculation mode signal Mode associated with the first precision Pr1, and the weight Weight and the input activation Act_In of the first precision Pr1.

Whether at least a part of the weight Weight and the input activation Act_In is greater than a predetermined value may be determined (S101). According to some embodiments, the path determination unit PDU may determine whether the weight Weight and the input activation Act_In exceed a greatest value of the second precision Pr2.

When at least a part of the weight Weight and the input activation Act_In is greater than a predetermined value (S101, Y), calculation of the weight Weight and the input activation Act_In may be performed as the first precision Pr1 (S102). According to some embodiments, when at least a part of the weight Weight and the input activation Act_In exceeds the greatest value of the second precision Pr2, the path determination unit PDU may generate the path determination signal PD as a first signal for selecting the first path Path #1. Subsequently, the path determination unit PDU may provide the demultiplexer Dx with the weight Weight and the input activation Act_In of the first precision Pr1 and the path determination signal PD which is the first signal and provide the first multiplier Mul1 with the weight Weight and the input activation (Act_In) of the first precision Pr1 in response to the path determination signal PD which is the first signal, thereby performing calculation of the weight Weight and the activation Act_In as the first precision Pr1.

Meanwhile, when at least a part of the weight Weight and the input activation Act_In is not greater than a predetermined value (S101, N), the weight Weight and the input activation Act_In of the first precision Pr1 may be converted into the weight Weight and the input activation Act_In of the second precision Pr2 (S103), and calculation of the weight Weight and the input activation Act_In may be performed as the second precision Pr2 (S104). According to some embodiments, when at least a part of the weight Weight and the input activation Act_In does not exceed the greatest value of the second precision Pr2, the path determination unit PDU may generate the path determination signal PD as a second signal for selecting the second path Path #2. Subsequently, the path determination unit PDU may convert the weight Weight and the input activation Act_In of the first precision Pr1 into the weight Weight and the input activation Act_In of the second precision Pr2. Subsequently, the path determination unit PDU may provide the demultiplexer Dx with the weight Weight and the input activation Act_In converted into the second precision Pr2 and the path determination signal PD which is the second signal, and provide the second multiplier Mul2 with the weight Weight and the input activation Act_In converted into the second precision Pr2, thereby performing calculation of the weight Weight and the input activation Act_In as the second precision Pr2.

FIG. 30 is a diagram illustrating a calculation method of a neural processing device according to some other embodiments of the present disclosure.

Referring to FIGS. 18 and 30, the weight Weight and the input activation Act_In may be received (S200). According to some embodiments, the path determination unit PDU may receive the weight Weight and the input activation Act_In. In addition, the path determination unit PDU may receive the calculation mode signal Mode.

When the calculation mode signal Mode is associated with the first precision Pr1 (S201, Y), it may be determined whether at least a part of the weight Weight and the input activation Act_In is greater than a predetermined value. (S202). According to some embodiments, the path determination unit PDU may determine whether the weight Weight and the input activation Act_In exceed the greatest value of the second precision Pr2.

When at least a part of the weight Weight and the input activation Act_In is greater than a predetermined value (S202, Y), calculation of the weight Weight and the input activation Act_In may be performed as the first precision Pr1 (S203). According to some embodiments, when at least a part of the weight Weight and the input activation Act_In exceeds the greatest value of the second precision Pr2, the path determination unit PDU may generate the path determination signal PD as a first signal for selecting the first path Path #1. Subsequently, the path determination unit PDU may provide the demultiplexer Dx with the weight Weight and the input activation Act_In of the first precision Pr1 and the path determination signal PD which is the first signal, and provide the first multiplier Mul1 with the weight Weight and the input activation Act_In of the first precision Pr1 in response to the path determination signal PD which is the first signal, thereby performing calculation of the weight Weight and the input activation Act_In as the first precision Pr1.

Meanwhile, when at least a part of the weight Weight and the input activation Act_In is not greater than the predetermined value (S202, N), the weight Weight and the input activation Act_In of the first precision Pr1 may be converted into the weight Weight and the input activation Act_In of the second precision Pr2 (S204), and it may be determined whether or not an overflow error or an underflow error occurs when performing calculation of the weight Weight and the input activation Act_In converted into the second precision Pr2 (S205). According to some embodiments, when at least a part of the weight Weight and the input activation Act_In does not exceed the greatest value of the second precision Pr2, the path determination unit PDU may generate the path determination signal PD as a second signal for selecting the second path Path #2. Subsequently, the path determination unit PDU may convert the weight Weight and the input activation Act_In of the first precision Pr1 into the weight Weight and the input activation Act_In of the second precision Pr2. Subsequently, the path determination unit PDU may check whether an overflow error or an underflow error occurs in the weight Weight and the input activation Act_In converted into the second precision Pr2.

When an overflow error or an underflow error is detected in the weight Weight and the input activation Act_In converted into the second precision Pr2 (S205, Y), calculation of the weight Weight and the input activation Act_In may be performed as the first precision Pr1 (S203). Meanwhile, when no overflow error or no underflow error is detected in the weight Weight and the input activation Act_In converted into the second precision Pr2 (S205, N), calculation of the weight Weight and the input activation Act_In may be performed as the second precision Pr2 (S206).

Meanwhile, when the calculation mode signal Mode is the second precision Pr2 (S201, N), whether an overflow error or an underflow error occurs when performing calculation of the weight Weight and the input activation Act_In of the second precision Pr2 may be determined (S205). When the overflow error or the underflow error occurs (S205, Y), calculation of the weight Weight and the input activation Act_In may be performed as the first precision Pr1 (S203), and when the overflow error or the underflow error does not occur (S205, N), calculation of the weight Weight and the input activation Act_In may be performed as the second precision Pr2 (S206).

The above description is merely illustrative of the technical ideas of the present embodiments, and various modifications and variations may be made by those skilled in the art to which the present embodiments belong without departing from the essential characteristics of the present embodiments. Accordingly, the present embodiments are intended to describe rather than limit the technical ideas of the present embodiments, and the scopes of the technical ideas of the present embodiments are not limited by the embodiments. The protection scope of the present embodiments should be interpreted by the following claims, and all technical ideas within the scope equivalent thereto should be interpreted as being included in the scope of the present embodiment.

What is claimed is:

1. A processing element comprising:
a weight register configured to store a weight;
an input activation register configured to store an input activation;
a flexible multiplier configured to receive a first sub-weight of a first precision included in the weight, receive a first sub-input activation of the first precision included in the input activation, and generate result data by performing multiplication calculation of the first sub-weight and the first sub-input activation as the first precision or a second precision different from the first precision according to the first sub-weight and the first sub-input activation; and
a saturating adder configured to generate a partial sum by using the result data,
wherein the flexible multiplier includes:
a first multiplier configured to perform multiplication calculation with the first precision,
a second multiplier separate from the first multiplier, configured to perform multiplication calculation with the second precision, and
a path determination unit configured to generate a path determination signal to determine which multiplier performs the multiplication calculation of the first sub-weight and the first sub-input activation among the first multiplier and the second multiplier, based on the first sub-weight and the first sub-input activation.

2. The processing element of claim 1, wherein the flexible multiplier further includes
a demultiplexer configured to provide any one of the first multiplier and the second multiplier with the first sub-weight and the first sub-input activation in response to the path determination signal.

3. The processing element of claim 2, wherein the path determination unit generates the path determination signal as a first signal for providing the first sub-weight and the first sub-input activation to the first multiplier if a size of at least one of the first sub-weight and the first sub-input activation is greater than a predetermined first size, and
generates the path determination signal as a second signal for providing the first sub-weight and the first sub-input activation to the second multiplier if a size of each of the first sub-weight and the first sub-input activation is less than or equal to the first size.

4. The processing element of claim 2, wherein the path determination unit includes
a bit division logic configured to generate the first sub-weight by dividing the weight into a unit of the first precision or the second precision and generate the first sub-input activation by dividing the input activation into a unit of the first precision or the second precision in response to the calculation mode signal,
a path selection logic configured to generate the path determination signal based on the calculation mode signal, the first sub-weight, and the first sub-input activation, and
a conversion logic configured to convert precisions of the first sub-weight and the first sub-input activation.

5. The processing element of claim 2, wherein the number of the first multipliers is k, and the number of the second multipliers is 2k, where k is a natural number.

6. The processing element of claim 2, wherein the first precision has 2N bits, and the second precision has N bits, where N is a natural number.

7. The processing element of claim 6, wherein the first precision is INT4 and the second precision is INT2.

8. The processing element of claim 2, wherein
the weight includes the first sub-weight and the second sub-weight,
the input activation includes the first sub-input activation and the second sub-input activation,
the flexible multiplier generates a first path determination signal based on the first sub-weight and the first sub-input activation, and generates a second path determination signal based on the second sub-weight and the second sub-input activation, and
the first path determination signal and the second path determination signal are independently generated.

9. The processing element of claim 2, wherein
the weight includes the first sub-weight and the second sub-weight,
the input activation includes the first sub-input activation and the second sub-input activation, and
the flexible multiplier generates the path determination signal based on the first sub-weight, the second sub-weight, the first sub-input activation, and the second sub-input activation.

10. The processing element of claim 1, wherein the flexible multiplier includes a control pipeline configured to synchronize reception of the first sub-weight and the first sub-input activation with generation of the result data.

11. A processing element comprising:
a weight register configured to store a weight;
an input activation register configured to store an input activation;
a flexible multiplier configured to generate result data by performing multiplication calculation of the weight and the input activation as the first precision or a second precision different from the first precision based on a calculation mode signal; and
a saturating adder configured to generate a partial sum by using the result data,
wherein the flexible multiplier includes:
a first multiplier configured to perform multiplication calculation, wherein the first multiplier has k multipliers with the first precision,
a second multiplier separate from the first multiplier, configured to perform multiplication calculation, wherein the second multiplier has 2k multipliers with the second precision, and
a path selection logic configured to select any one of the first multiplier and the second multiplier based on sizes of the weight and the input activation.

12. The processing element of claim 11, wherein the flexible multiplier further includes
an error detection logic configured to generate a detection result by checking whether overflow or underflow occurs according to multiplication calculation of the weight and the input activation.

13. The processing element of claim 12, wherein the path selection logic selects any one of the first multiplier and the second multiplier based on whether at least one of the weight and the input activation is greater than a greatest value of the second precision, if the calculation mode signal is associated with the first precision.

14. The processing element of claim 13, wherein
the error detection logic generates a first result if overflow or underflow occurs in multiplication calculation of the weight and the input activation and generates a second result if overflow or underflow does not occur in the multiplication calculation of the weight and the input activation, and
in a case where each of the weight and the input activation is less than the greatest value of the second precision, the path selection logic selects the first multiplier if the detection result is the first result and selects the second multiplier if the detection result is the second result.

15. The processing element of claim 12, wherein the path selection logic selects any one of the first multiplier and the second multiplier according to the detection result when the calculation mode signal is associated with the second precision.

16. The processing element of claim 15, wherein
the error detection logic generates a first result if overflow or underflow occurs in the multiplication calculation of the weight and the input activation and generates a second result if the overflow or the underflow does not occur in the multiplication calculation of the weight and the input activation, and
the path selection logic selects the first multiplier if the detection result is the first result and selects the second multiplier if the detection result is the second result.

* * * * *